US012567533B2

(12) United States Patent
Hanson et al.

(10) Patent No.: US 12,567,533 B2
(45) Date of Patent: Mar. 3, 2026

(54) INDUCTOR WITH PREFORMED TERMINATION AND METHOD AND ASSEMBLY FOR MAKING THE SAME

(71) Applicant: VISHAY DALE ELECTRONICS, LLC, Columbus, NE (US)

(72) Inventors: Benjamin Hanson, Lennox, SD (US); Tyler Witzel, Yankton, SD (US)

(73) Assignee: VISHAY DALE ELECTRONICS, LLC, Columbus, NE (US)

( * ) Notice: Subject to any disclaimer, the term of this patent is extended or adjusted under 35 U.S.C. 154(b) by 0 days.

(21) Appl. No.: 17/187,161

(22) Filed: Feb. 26, 2021

(65) Prior Publication Data

US 2021/0280361 A1 Sep. 9, 2021

Related U.S. Application Data

(60) Provisional application No. 62/984,584, filed on Mar. 3, 2020.

(51) Int. Cl.
*H01F 27/29* (2006.01)
*H01F 27/255* (2006.01)

(52) U.S. Cl.
CPC ........... *H01F 27/29* (2013.01); *H01F 27/255* (2013.01)

(58) Field of Classification Search
CPC .. H01F 17/04; H01F 2017/048; H01F 27/255; H01F 27/2852; H01F 27/29; H01F 27/292; H01F 41/0246
See application file for complete search history.

(56) References Cited

U.S. PATENT DOCUMENTS

| | | | |
|---|---|---|---|
| 1,085,437 | A | 1/1914 | Klopfer |
| 2,497,516 | A | 2/1950 | Phelps |

(Continued)

FOREIGN PATENT DOCUMENTS

| | | | |
|---|---|---|---|
| CN | 1059231 | A | 3/1992 |
| CN | 1413351 | A | 4/2003 |

(Continued)

OTHER PUBLICATIONS

English Machine Translation: Yamazaki et al. (JP 2000-323336).*

(Continued)

*Primary Examiner* — Holly Rickman
*Assistant Examiner* — Linda N Chau
(74) *Attorney, Agent, or Firm* — Volpe Koenig

(57) ABSTRACT

An inductor and method and assembly for making the same are provided. The inductor includes a preformed conductive coil comprising a medial portion between first and second terminal leads, and an inductor body comprising a magnetic material surrounding at least the medial portion of the preformed conductive coil. At least a portion of each of the first and second terminal leads of the preformed conductive coil is exposed outside of the inductor body. The method for making the inductor includes providing a one-piece conductive coil having a substantially curve-shaped medial portion and first and second terminal leads and molding a magnetic material around at least the medial portion of the formed conductive coil to form an inductor body, wherein at least a portion of the first and second terminal leads of the formed one-piece conductive coil are exposed outside of the inductor body.

24 Claims, 15 Drawing Sheets

(56) References Cited

U.S. PATENT DOCUMENTS

| | | | | |
|---|---|---|---|---|
| 2,889,525 | A | | 6/1959 | Smith |
| 3,169,234 | A | | 2/1965 | Renskers |
| 3,668,586 | A | | 6/1972 | Horbach |
| 3,958,328 | A | | 5/1976 | Lee |
| 4,180,450 | A | | 12/1979 | Morrison |
| 4,223,360 | A | | 9/1980 | Sansom et al. |
| 4,413,161 | A | | 11/1983 | Matsumoto et al. |
| 4,901,048 | A | | 2/1990 | Williamson |
| 5,010,314 | A | | 4/1991 | Estrov |
| 5,126,715 | A | | 6/1992 | Yerman et al. |
| 5,245,307 | A | | 9/1993 | Klaus et al. |
| D340,692 | S | | 10/1993 | Iijima et al. |
| 5,451,914 | A | | 9/1995 | Stengel |
| 5,481,238 | A | | 1/1996 | Carsten et al. |
| D390,825 | S | | 2/1998 | Chen |
| 5,773,886 | A | | 6/1998 | Rostoker et al. |
| 5,801,432 | A | | 9/1998 | Rostoker et al. |
| 5,821,624 | A | | 10/1998 | Pasch |
| 5,844,451 | A | | 12/1998 | Murphy |
| 5,875,541 | A | * | 3/1999 | Kumeji .................... H03H 3/00 29/608 |
| 5,888,848 | A | | 3/1999 | Cozar et al. |
| 5,912,609 | A | | 6/1999 | Usui et al. |
| 5,913,551 | A | | 6/1999 | Tsutsumi et al. |
| 5,917,396 | A | | 6/1999 | Halser, III |
| 5,949,321 | A | | 9/1999 | Grandmont et al. |
| 6,026,311 | A | | 2/2000 | Willemsen Cortes |
| D421,595 | S | | 3/2000 | Davis |
| 6,060,976 | A | | 5/2000 | Yamaguchi et al. |
| 6,078,502 | A | | 6/2000 | Rostoker et al. |
| 6,081,416 | A | | 6/2000 | Trinh et al. |
| 6,087,922 | A | | 7/2000 | Smith |
| 6,114,932 | A | | 9/2000 | Wester et al. |
| 6,204,744 | B1 | | 3/2001 | Shafer et al. |
| 6,222,437 | B1 | | 4/2001 | Soto et al. |
| 6,236,297 | B1 | | 5/2001 | Chou et al. |
| 6,255,725 | B1 | | 7/2001 | Akagawa et al. |
| 6,317,965 | B1 | | 11/2001 | Okamoto et al. |
| 6,326,739 | B1 | | 12/2001 | MacLennan |
| 6,351,033 | B1 | | 2/2002 | Lotfi et al. |
| 6,392,525 | B1 | | 5/2002 | Kato et al. |
| 6,409,859 | B1 | | 6/2002 | Chung |
| 6,438,000 | B1 | | 8/2002 | Okamoto et al. |
| 6,456,184 | B1 | | 9/2002 | Vu et al. |
| 6,460,244 | B1 | | 10/2002 | Shafer et al. |
| 6,476,689 | B1 | | 11/2002 | Uchida et al. |
| 6,546,184 | B2 | | 4/2003 | Kamiya |
| 6,617,948 | B2 | | 9/2003 | Kuroshima et al. |
| 6,713,162 | B2 | | 3/2004 | Takaya et al. |
| 6,723,775 | B2 | | 4/2004 | Lau et al. |
| 6,734,074 | B2 | | 5/2004 | Chen et al. |
| 6,765,284 | B2 | | 7/2004 | Gibson et al. |
| 6,774,757 | B2 | | 8/2004 | Fujiyoshi et al. |
| 6,869,238 | B2 | | 3/2005 | Shiguro |
| 6,879,235 | B2 | | 4/2005 | Ichikawa |
| 6,879,238 | B2 | | 4/2005 | Liu et al. |
| 6,882,261 | B2 | | 4/2005 | Moro et al. |
| 6,888,435 | B2 | | 5/2005 | Inoue et al. |
| 6,933,895 | B2 | | 8/2005 | Mendolia et al. |
| 6,940,154 | B2 | | 9/2005 | Pedron et al. |
| 6,965,517 | B2 | | 11/2005 | Wanes et al. |
| 6,998,952 | B2 | | 2/2006 | Zhou et al. |
| 7,023,313 | B2 | | 4/2006 | Sutardja |
| 7,034,645 | B2 | | 4/2006 | Shafer et al. |
| 7,046,492 | B2 | | 5/2006 | Fromm et al. |
| 7,126,443 | B2 | | 10/2006 | De Bhailis et al. |
| 7,176,506 | B2 | | 2/2007 | Beroz et al. |
| 7,192,809 | B2 | | 3/2007 | Abbott |
| 7,218,197 | B2 | | 5/2007 | Sutardja |
| 7,221,251 | B2 | | 5/2007 | Menegoli et al. |
| 7,289,013 | B2 | | 10/2007 | Decristofaro et al. |
| 7,289,329 | B2 | | 10/2007 | Chen et al. |
| 7,292,128 | B2 | | 11/2007 | Hanley |
| 7,294,587 | B2 | | 11/2007 | Asahi et al. |
| 7,295,448 | B2 | | 11/2007 | Zhu |
| 7,307,502 | B2 | | 12/2007 | Sutardja |
| 7,317,373 | B2 | | 1/2008 | Hsu et al. |
| 7,339,451 | B2 | | 3/2008 | Liu et al. |
| 7,345,562 | B2 | | 3/2008 | Shafer |
| 7,392,581 | B2 | | 7/2008 | Sano et al. |
| 7,456,722 | B1 | | 11/2008 | Eaton et al. |
| 7,460,002 | B2 | | 12/2008 | Estrov |
| 7,469,469 | B2 | | 12/2008 | Nakata et al. |
| D586,745 | S | | 2/2009 | Shibata et al. |
| 7,489,219 | B2 | | 2/2009 | Satardja |
| 7,540,747 | B2 | | 6/2009 | Ice et al. |
| 7,541,908 | B2 | | 6/2009 | Kitahara et al. |
| 7,545,026 | B2 | | 6/2009 | Six |
| 7,567,163 | B2 | | 7/2009 | Dadafshar et al. |
| 7,629,860 | B2 | | 12/2009 | Liu et al. |
| 7,667,565 | B2 | | 2/2010 | Liu |
| 7,675,396 | B2 | | 3/2010 | Liu et al. |
| 7,705,418 | B2 | | 4/2010 | Kono et al. |
| 7,705,508 | B2 | | 4/2010 | Dooley |
| 7,736,951 | B2 | | 6/2010 | Prajuckamol et al. |
| 7,786,834 | B2 | | 8/2010 | Yagasaki et al. |
| 7,791,445 | B2 | | 9/2010 | Manoukian et al. |
| 7,825,502 | B2 | | 11/2010 | Irving et al. |
| 7,849,586 | B2 | | 12/2010 | Sutardja |
| 7,868,725 | B2 | | 1/2011 | Sutardja |
| 7,872,350 | B2 | | 1/2011 | Otremba et al. |
| 7,882,614 | B2 | | 2/2011 | Sutardja |
| 7,915,993 | B2 | | 3/2011 | Liu et al. |
| 7,920,043 | B2 | | 4/2011 | Nakagawa et al. |
| 7,987,580 | B2 | | 8/2011 | Sutardja |
| 7,999,650 | B2 | | 8/2011 | Mori |
| 8,028,401 | B2 | | 10/2011 | Sutardja |
| 8,035,471 | B2 | | 10/2011 | Sutardja |
| D649,115 | S | | 11/2011 | Miura |
| 8,049,588 | B2 | | 11/2011 | Shibuya et al. |
| 8,080,865 | B2 | | 12/2011 | Harvey |
| 8,097,934 | B1 | | 1/2012 | Li et al. |
| 8,098,123 | B2 | | 1/2012 | Sutardja |
| 8,164,408 | B2 | | 4/2012 | Kim |
| 8,279,037 | B2 | | 10/2012 | Yan et al. |
| 8,310,332 | B2 | | 11/2012 | Yan et al. |
| 8,350,659 | B2 | | 1/2013 | Dziubek et al. |
| 8,378,777 | B2 | | 2/2013 | Yan et al. |
| 8,400,245 | B2 | | 3/2013 | Yan et al. |
| 8,466,764 | B2 | | 6/2013 | Bogert et al. |
| 8,484,829 | B2 | | 7/2013 | Manoukian et al. |
| D693,302 | S | | 11/2013 | Yamada et al. |
| 8,659,379 | B2 | | 2/2014 | Yan et al. |
| 8,695,209 | B2 | | 4/2014 | Saito et al. |
| 8,698,587 | B2 | | 4/2014 | Park et al. |
| 8,707,547 | B2 | | 4/2014 | Lee |
| 8,910,369 | B2 | | 12/2014 | Herbsommer et al. |
| 8,910,373 | B2 | | 12/2014 | Yan et al. |
| 8,916,408 | B2 | | 12/2014 | Huckabee et al. |
| 8,916,421 | B2 | | 12/2014 | Gong et al. |
| 8,927,342 | B2 | | 1/2015 | Goesele et al. |
| 8,941,457 | B2 | | 1/2015 | Yan et al. |
| 8,998,454 | B2 | | 4/2015 | Wang et al. |
| 9,001,524 | B1 | | 4/2015 | Akre |
| 9,029,741 | B2 | | 5/2015 | Montoya et al. |
| 9,141,157 | B2 | | 9/2015 | Mohd Arshad et al. |
| 9,142,345 | B2 | | 9/2015 | Chen et al. |
| 9,177,945 | B2 | | 11/2015 | Saye |
| 9,190,389 | B2 | | 11/2015 | Meyer-Berg et al. |
| 9,276,339 | B2 | | 3/2016 | Rathburn |
| 9,318,251 | B2 | | 4/2016 | Klesyk et al. |
| 9,368,423 | B2 | | 6/2016 | Do et al. |
| 9,373,567 | B2 | | 6/2016 | Tan |
| 9,614,423 | B2 | | 4/2017 | Weller et al. |
| 9,679,694 | B2 | | 6/2017 | Kitami et al. |
| D796,438 | S | | 9/2017 | Kakuda et al. |
| 9,842,682 | B2 | | 12/2017 | Yan et al. |
| 9,978,506 | B2 | | 5/2018 | Ohtsubo et al. |
| 10,002,706 | B2 | | 6/2018 | Dien |
| 10,109,409 | B2 | | 10/2018 | Lee et al. |
| 10,319,507 | B2 | | 6/2019 | Klesyk et al. |
| 10,332,667 | B2 | | 6/2019 | Jeong et al. |
| D884,630 | S | | 5/2020 | Konno |
| 10,796,842 | B2 | | 10/2020 | Huang et al. |

(56) References Cited

U.S. PATENT DOCUMENTS 10,840,005 B2 11/2020 Blow
10,854,367 B2 12/2020 Hanson et al.
D906,965 S 1/2021 Oka et al.
11,049,638 B2 6/2021 Hanson et al.
11,762,405 B2 9/2023 Morroni
11,791,087 B2 10/2023 Jin et al.
2002/0011914 A1 1/2002 Ikeura et al.
2002/0040077 A1 4/2002 Hanejko et al.
2002/0130752 A1 9/2002 Kuroshima
2002/0158739 A1 10/2002 Shibata et al.
2003/0016112 A1 1/2003 Brocchi
2003/0141952 A1 7/2003 Moro et al.
2003/0178694 A1 9/2003 Lemaire
2004/0017276 A1 1/2004 Chen et al.
2004/0061584 A1 4/2004 Darmann
2004/0100347 A1 5/2004 Okamoto
2004/0232982 A1 11/2004 Ichitsubo et al.
2004/0245232 A1 12/2004 Ihde et al.
2005/0012581 A1 1/2005 Ono et al.
2005/0030141 A1 2/2005 Barber et al.
2005/0273938 A1 12/2005 Metzger et al.
2006/0001517 A1 1/2006 Cheng
2006/0038653 A1 2/2006 Cheng
2006/0113645 A1 6/2006 Warner et al.
2006/0132272 A1 6/2006 Kitahara et al.
2007/0052510 A1 3/2007 Saegusa et al.
2007/0109087 A1 5/2007 Kawarai
2007/0166554 A1 7/2007 Ruchert et al.
2007/0186407 A1 8/2007 Shafer et al.
2007/0247268 A1 10/2007 Oya et al.
2007/0252669 A1 11/2007 Hansen et al.
2007/0257759 A1 11/2007 Lee et al.
2008/0012674 A1* 1/2008 Sano .................... H05K 1/0233
336/83
2008/0029879 A1 2/2008 Tuckerman et al.
2008/0110014 A1 5/2008 Shafer et al.
2008/0150670 A1 6/2008 Chung et al.
2008/0303606 A1 12/2008 Liu et al.
2009/0057822 A1 3/2009 Wen et al.
2009/0115562 A1 5/2009 Lee et al.
2010/0007452 A1 1/2010 Forsberg et al.
2010/0007453 A1 1/2010 Yan et al.
2010/0060401 A1 3/2010 Tai et al.
2010/0097171 A1 4/2010 Urata et al.
2010/0123541 A1 5/2010 Saka et al.
2010/0171579 A1 7/2010 Yan et al.
2010/0271161 A1 10/2010 Yan et al.
2010/0314728 A1 12/2010 Li
2010/0328003 A1 12/2010 Shibuya et al.
2011/0227690 A1 9/2011 Watanabe et al.
2011/0260825 A1 10/2011 Doljack et al.
2011/0273257 A1 11/2011 Ishizawa
2012/0049334 A1 3/2012 Pagaila et al.
2012/0176214 A1 7/2012 Hsiao
2012/0216392 A1 8/2012 Fan
2012/0273932 A1 11/2012 Mao et al.
2013/0015939 A1 1/2013 Inagaki et al.
2013/0181803 A1 7/2013 Wyville
2013/0249546 A1 9/2013 David et al.
2013/0273692 A1 10/2013 McMillan et al.
2013/0278571 A1 10/2013 Ahn
2013/0307117 A1 11/2013 Koduri
2014/0008974 A1 1/2014 Miyamoto
2014/0125441 A1 5/2014 Hongping et al.
2014/0210062 A1 7/2014 Miyazaki
2014/0210584 A1 7/2014 Blow
2014/0302718 A1 10/2014 Gailus
2014/0313003 A1 10/2014 Liu
2014/0320124 A1 10/2014 David et al.
2014/0340186 A1 11/2014 Wang et al.
2014/0361423 A1 12/2014 Chi et al.
2015/0214198 A1 7/2015 Lee et al.
2015/0263576 A1 9/2015 Kato
2015/0270860 A1 9/2015 McCain
2016/0055954 A1 2/2016 Huang et al.
2016/0069545 A1 3/2016 Chien et al.
2016/0073509 A1 3/2016 Zhang et al.
2016/0099189 A1 4/2016 Khai Yen et al.
2016/0133373 A1 5/2016 Orr et al.
2016/0181001 A1 6/2016 Doljack et al.
2016/0190918 A1 6/2016 Ho et al.
2016/0217914 A1 7/2016 Kim et al.
2016/0217922 A1 7/2016 Sherrer
2017/0309394 A1 10/2017 Blow
2018/0061547 A1 3/2018 Hanson
2018/0137969 A1 5/2018 Hamamura et al.
2018/0301276 A1 10/2018 Yeh et al.
2018/0315542 A1 11/2018 Hayashi
2018/0342346 A1 11/2018 Hashimoto
2019/0088397 A1 3/2019 Ohtsubo
2019/0214181 A1 7/2019 Wang et al.
2019/0244745 A1 8/2019 Kojima et al.
2019/0272945 A1 9/2019 Arai et al.
2019/0311831 A1 10/2019 Yeo et al.
2021/0012577 A1 1/2021 Stansell et al.
2021/0090786 A1* 3/2021 Arai ...................... H01F 27/255
2021/0125773 A1 4/2021 Yan et al.
2023/0283172 A1 9/2023 Gao et al.

FOREIGN PATENT DOCUMENTS

CN 1677581 A 10/2005
CN 1798474 A 7/2006
CN 1885538 A 12/2006
CN 101467222 A 6/2009
CN 101578671 A 11/2009
CN 101640554 A 2/2010
CN 102044327 A 5/2011
CN 201877237 U 6/2011
CN 102376438 A 3/2012
CN 102822913 A 12/2012
CN 103680861 A 3/2014
CN 104247220 B 3/2017
CN 104685587 B 3/2017
CN 207134214 U 3/2018
CN 207558566 U 6/2018
CN 208596597 U 3/2019
CN 208706396 U 4/2019
CN 109754986 A 5/2019
CN 209388809 U 9/2019
EP 0593020 A1 4/1994
EP 0 606 973 A1 7/1994
EP 0606973 A 7/1994
EP 0662699 B1 5/1998
EP 1833063 A1 9/2007
EP 1 933 340 A1 6/2008
EP 1833063 A9 7/2008
EP 1 091 369 A2 11/2011
EP 2 518 740 A1 10/2012
GB 1 071 469 6/1967
JP H02-036013 A 2/1990
JP 03-171793 A 7/1991
JP H03-171703 A 7/1991
JP 04059396 A 2/1992
JP H04-59396 A 2/1992
JP H04-129206 A 4/1992
JP H05 258959 A 10/1993
JP H06-125236 A 5/1994
JP H06 55211 U 7/1994
JP H0655215 U 7/1994
JP H06 283338 A 10/1994
JP H07-245217 A 9/1995
JP H07-273292 A 10/1995
JP H09-306757 A 11/1997
JP H11340060 A 12/1999
JP 2000021656 A 1/2000
JP 2000091133 A 3/2000
JP 2000323336 A 11/2000
JP 2002036013 A 2/2002
JP 2003171793 A 6/2003
JP 2003309024 A 10/2003
JP 2004022814 A 1/2004
JP 2004087607 A 3/2004
JP 2004266120 A 9/2004

(56) References Cited

FOREIGN PATENT DOCUMENTS

| | | | |
|---|---|---|---|
| JP | 2005-109290 | A | 4/2005 |
| JP | 2005310865 | A | 11/2005 |
| JP | 2006505142 | A | 2/2006 |
| JP | 2007-005424 | A | 1/2007 |
| JP | 2007273292 | A | 10/2007 |
| JP | 2009-535804 | A | 10/2009 |
| JP | 2009224815 | A | 10/2009 |
| JP | 2011054811 | A | 3/2011 |
| JP | 4768383 | B2 | 9/2011 |
| JP | 2012-104724 | A | 5/2012 |
| JP | 2012-142554 | A | 7/2012 |
| JP | 2012195399 | A | 10/2012 |
| JP | 2017220573 | A | 12/2017 |
| JP | 2018098312 | A | 6/2018 |
| JP | 2019-530217 | A | 10/2019 |
| JP | 20199530217 | A | 10/2019 |
| JP | 6681544 | B2 | 4/2020 |
| KR | 20180071644 | A | 6/2018 |
| TW | I299504 | B | 3/2003 |
| TW | 201616529 | A | 5/2016 |
| WO | 2010/129352 | A1 | 11/2010 |
| WO | 2018045007 | A1 | 3/2018 |

OTHER PUBLICATIONS

SMD Shielded Power Inductors—BPMV Series. Chilisin Electronics Corp. Mar. 2, 2020. 11 pp.

Chilisin Electronics Corp. BPMV00070795R20K2F Inductor. 2018. 2 pp.

SMD Power Inductors—BPSG/BPSW Series. Chilisin Electronics Corp. Mar. 2, 2020. 4 pp.

Delta Electronics/Cyntec Inductor. Mar. 2, 2020. 1 pp.

FP1108r, High frequency, high current power inductors. Technical Data 10227. Sep. 2017. 4 pp.

Cutress, Ian. Gigabyte Server GA-7PESH3 Motherboard Review. Anandtech. Sep. 4, 2014.

Preliminary Report on Patentability issued in corresponding PCT Patent Application No. PCT/US2021/020488 on Dec. 10, 2021. 17 pp.

Search Report and Written Opinion issued in corresponding PCT Patent Application No. PCT/US2021/020488 on May 21, 2021. 17 pp.

Office Action issued in corresponding Japanese Application No. 2022161470 dated Oct. 3, 2023. English Translation Included.

Restriction Requirement issued in corresponding U.S. Appl. No. 29/722,318 dated Nov. 22, 2023.

Extended European Search Report for Application No. 21764949.0, dated Feb. 9, 2024.

"Second Office Action Issued in Corresponding Japanese Patent Application No. 2022-161470", Mailed Date: Aug. 6, 2024, 6 pages.

"Notice of Allowance and Fees Due Issued in Corresponding U.S. Appl. No. 29/941,218", Mailed Date: Oct. 1, 2024, 8 pages.

"Notice of Allowance and Fees Due Issued in Corresponding U.S. Appl. No. 29/941,218", Mailed Date: Feb. 5, 2025, 8 pages.

"Office Action Issued in Corresponding Japanese Patent Application No. 2022-552251", Mailed Date: Jan. 28, 2025, 11 pages.

Indian Patent Office, First Examination Report for corresponding application IN 202217049533, dated Nov. 11, 2025.

* cited by examiner

INDUCTOR WITH PREFORMED TERMINATION AND METHOD AND ASSEMBLY FOR MAKING THE SAME

CROSS REFERENCE TO RELATED APPLICATION

This application claims the benefit of U.S. Provisional Application Ser. No. 62/984,584, filed on Mar. 3, 2020, which is incorporated by reference as if fully set forth herein.

FIELD OF INVENTION

This application relates to the field of electronic components, and more specifically, inductors and methods and assemblies for making inductors.

BACKGROUND

Inductors are, generally, passive two-terminal electrical components which resist changes in electric current passing through them. An inductor includes a conductor, such as a wire, wound into a coil. When a current flows through the coil, energy is stored temporarily in a magnetic field in the coil. When the current flowing through an inductor changes, the time-varying magnetic field induces a voltage in the conductor, according to Faraday's law of electromagnetic induction.

Some known inductors are generally formed having a thin conductive wire sandwiched between or wound about multi-piece molded magnetic core materials having a C-shape, E-shape, a toroidal shape, or other shape, which can be attached by an adhesive. Air spaces are prevalent in inductor core designs where the core is made from two separate halves of magnetic core materials. Such air spaces can negatively affect operation and performance of the inductor.

Other known inductors are formed by pressing a powdered magnetic material around a conductive body. With such known inductors, the conductive coil has some ability to move within the die, particularly during pressing. As a result, the conductive coil can move within the core which can negatively affect the operation and performance of the inductor.

Some known inductors generally require that the conductive coil be welded to a lead frame to hold the parts together during formation. After pressing the magnetic material around the conductive coil, the leads must then be formed, such as by cutting the lead frame and bending the leads, to form the leads. Post-processing steps, such as cutting and bending, can lead to cracks or other imperfections in the integrity of the conductive wire or molded magnetic material and result in a significant amount of waste material and extra labor.

An issue within the relevant industry as it concerns inductors relates to inspection of lead areas suitable for solder connections. For example, these inspections can be performed by x-ray or by automated optical inspection (AOI). Automated optical inspection (AOI) systems are used to inspect, for example, semiconductor devices and printed circuit boards (PCBs), for defects. It is desirable to make an inductor having a lead that can allow for improved AOI, which is less costly than x-ray inspections.

A need exists for a simple and cost efficient way to produce an inductor utilizing the smallest footprint possible while maximizing the useable core area with minimal waste material.

SUMMARY

An inductor and method for making the same is disclosed herein.

In accordance with an aspect, the subject matter disclosed herein relates to an inductor including a preformed conductive coil comprising a medial portion between first and second terminal leads, and an inductor body comprising a magnetic material surrounding at least the medial portion of the preformed conductive coil. At least a portion of each of the first and second terminal leads of the preformed conductive coil is exposed outside of the inductor body.

In accordance with another aspect, the magnetic material can be magnetic particles that are molded around the medial portion of the conductive coil and portions of the first and second terminal leads of the conductive coil. The magnetic particles can be a powdered or granular magnetic material, or more particularly, powdered iron particles.

In accordance with another aspect, a conductive coil may be formed by bending a conductive material into a selected shape. The conductive coil can be circular, semi-circular, oblong, or omega-shaped.

In accordance with another aspect, the inductor body can be package-shaped having a bottom side (i.e., lead side), a top side, a right side, a left side, a front side, and a back side, and the portion of each of the first and second terminal leads exposed outside of the inductor body can be positioned along the bottom side or lead side of the inductor body. Each of the first and second terminal leads can further include a bottom portion that has an exposed portion positioned along the bottom side of the inductor body, and a side portion that terminates along a respective one of the right side and left side of the inductor body. Each of the right side and left side of the inductor body can include a cutout portion where the side portion of the respective one of the first and second terminal leads is positioned. The side portion of each of the first and second terminal leads can be preformed to be substantially perpendicular to the bottom portion.

In accordance with another aspect, the subject matter disclosed herein relates to a method for making an inductor which includes providing a conductor having a substantially curve-shaped medial portion and first and second terminal leads and molding a magnetic material around at least the medial portion of the formed conductive coil to form an inductor body, wherein at least a portion of the first and second terminal leads of the formed conductive coil can be exposed outside of the inductor body. The formed inductor body can be package-shaped having a bottom side, a top side, a right side, a left side, a front side, and a back side, and the first and second terminal leads can be exposed along the bottom side and a respective one of the right side and the left side of the inductor body. Molding the magnetic material can further include positioning the formed conductive coil in a mold assembly, introducing magnetic particles into the mold assembly, and pressing the magnetic particles around the conductive coil. Positioning the formed conductive coil can further include seating the first and second terminal leads of the formed conductive coil on first and second shelves formed within a wall of the mold assembly, wherein the first and second shelves have a shape that is complementary to the first and second terminal leads such that the first and second terminal leads function as a part of the wall of the mold assembly during molding. The first and second shelves can each further include a narrowing wall which forms a complementary cutout in each of the right side and the left side of the inductor body, and a portion of each of the first and second terminal leads can be positioned in a respective cutout.

In accordance with another aspect, the subject matter disclosed herein relates to an assembly for forming an inductor. The assembly includes a preformed conductive coil comprising a medial portion between first and second terminal leads, a mold section having a seating channel defined there through and a wall surrounding the seating channel, the wall comprising first and second shelves configured to receive the first and second terminal leads of the preformed conductive coil, and at least one punch configured to press magnetic particles around the conductive coil when the conductive coil is positioned within the mold. The first and second shelves have a shape that is complementary to the first and second terminal leads such that the first and second terminal leads contact the wall of the mold when the magnetic particles are pressed around the conductive coil.

DETAILED DESCRIPTION

Figure 1A:
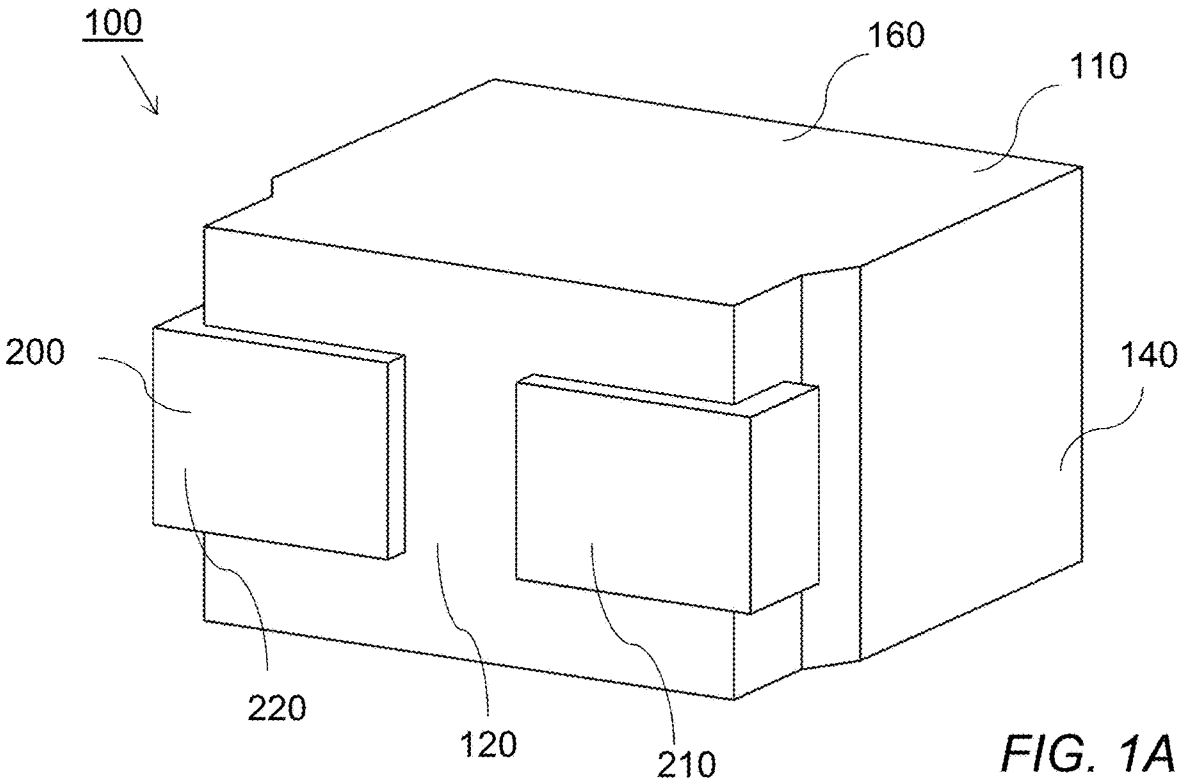
FIG. 1A is an isometric view of the lead-side of an exemplary embodiment of an inductor according to the present invention.
Figure 1B:
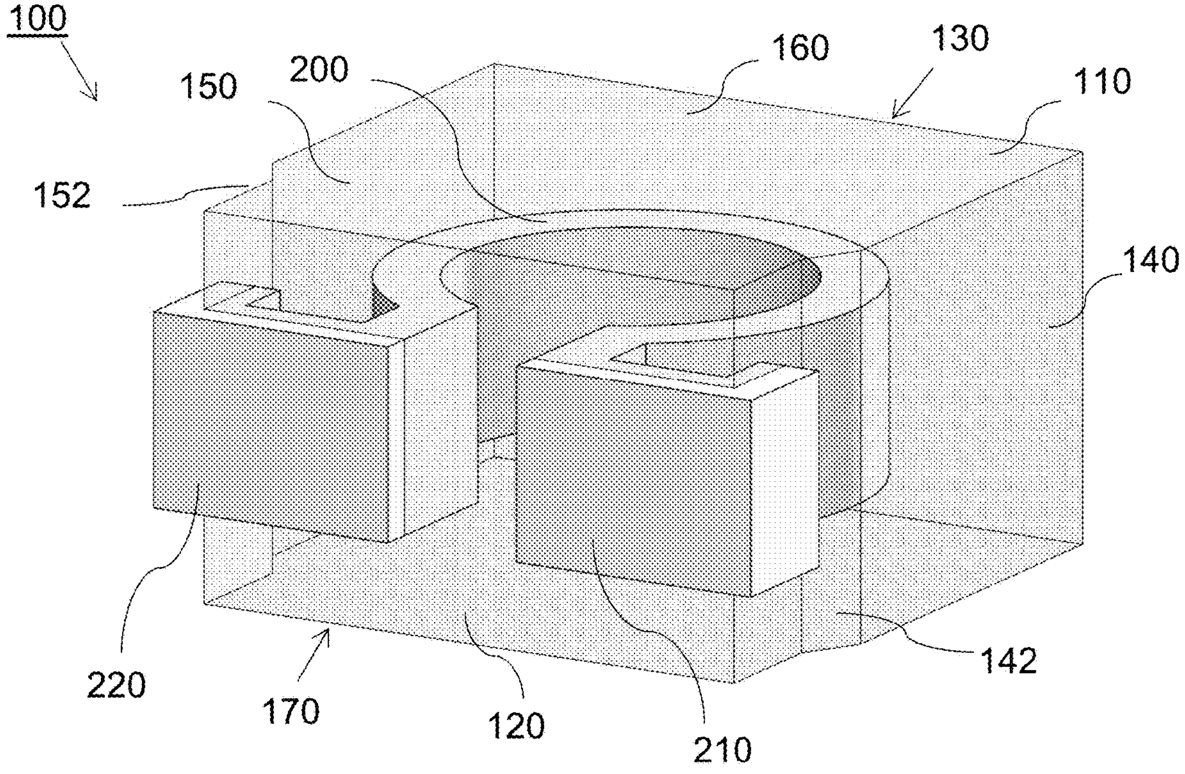
FIG. 1B is a partial transparent view of the inductor body of FIG. 1A showing the conductive coil.
Figure 1C:
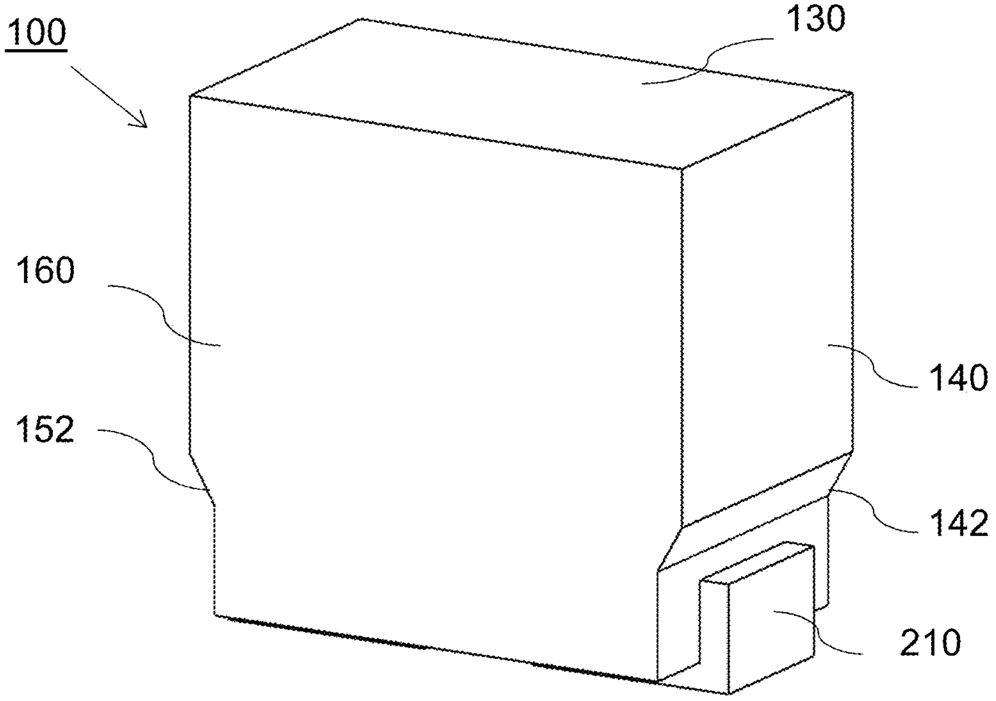
FIG. 1C is an isometric view of the front-right side of the inductor of FIG. 1A.
Figure 1D:
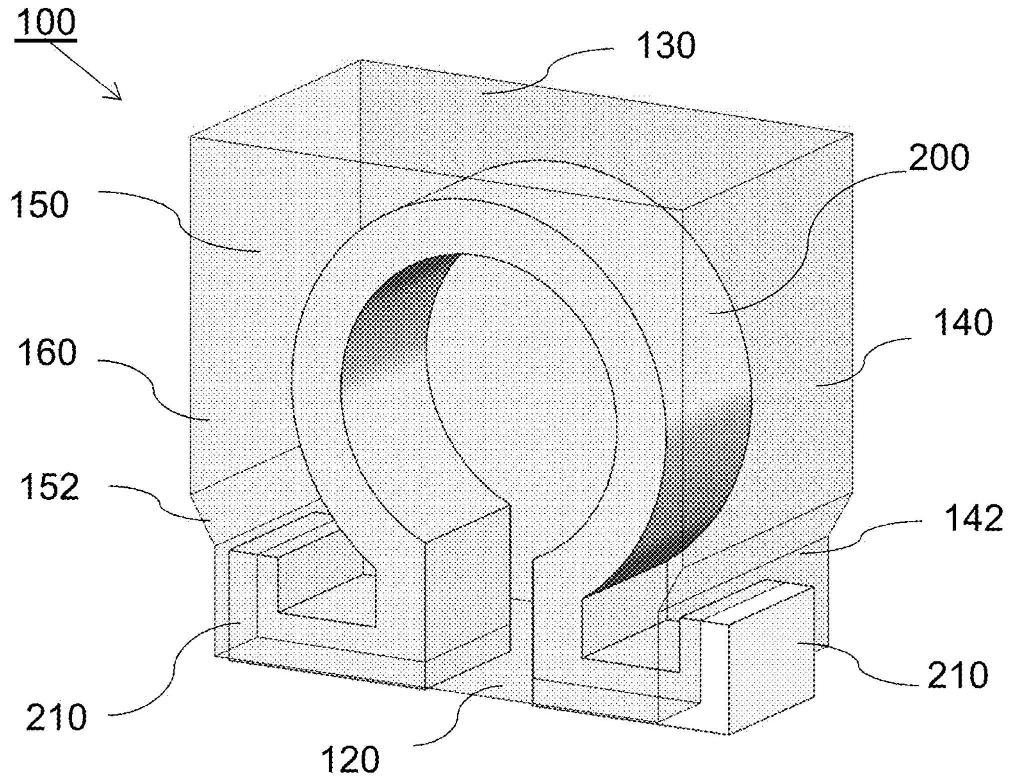
FIG. 1D is a partial transparent view of the inductor body of FIG. 1C showing the conductive coil.

An inductor with a preformed termination and method for making the same using a mold assembly are described herein.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof. It may be noted that some Figures are shown with partial transparency for the purpose of explanation, illustration and demonstration purposes only, and is not intended to indicate that an element itself would be transparent in its final manufactured form.

The description provided herein is to enable those skilled in the art to make and use the described embodiments set forth. Various modifications, equivalents, variations, combinations, and alternatives, however, will remain readily apparent to those skilled in the art. Any and all such modifications, variations, equivalents, combinations, and alternatives are intended to fall within the spirit and scope of the present invention defined by claims.

FIGS. 1A-1H show an inductor 100 according to an exemplary embodiment described herein. The inductor 100 preferably includes an inductor body 110 partially surrounding a preformed conductive coil 200. The inductor body 110 is preferably formed of a magnetic material that is molded about the conductive coil 200. In an embodiment, the inductor body 110 may be formed of a ferrous material. In an embodiment, the inductor body 110 may comprise, for example, iron, metal alloys, ferrite, combinations of the foregoing, or other materials known in the art of inductors and used to form such bodies. In an embodiment, the inductor body 110 may be formed from magnetic particles such as powdered or granular magnetic particles. In an embodiment, the magnetic particles can be powdered iron particles. In a non-limiting example, a magnetic material may be used for the inductor body comprised of a powdered iron particles, a filler, a resin, and a lubricant, such as described in U.S. Pat. No. 6,198,375 ("Inductor Coil Structure") and U.S. Pat. No. 6,204,744 ("High Current, Low Profile Inductor"), both of which are incorporated by reference as if fully set forth herein.

As shown in FIGS. 1A-1H, in an exemplary embodiment, the inductor body 110 is preferably package-shaped having a bottom side or lead side 120, a top side 130, a right side 140, a left side 150, a front side 160, and a back side 170. Non-limiting examples of a package-shape include a box-shape, a cuboid shape, a rectangular prism, any of the foregoing including rounded corners (see FIG. 8A), one or more irregular surface, etc. One of ordinary skill in the art will recognize that other inductors shapes can be employed without departing from the spirit of the invention. For example, an inductor 100 with preformed terminations formed according to the present disclosure, can have non-matching mold sections that are formed together in a mold assembly. The inductor body 110 is preferably formed about the conductive coil 200 such that right and left leads 210, 220 of the conductive coil 200 are exposed outside of the inductor body 110 along the lead side 120 of the inductor body 110.

Figure 2A:
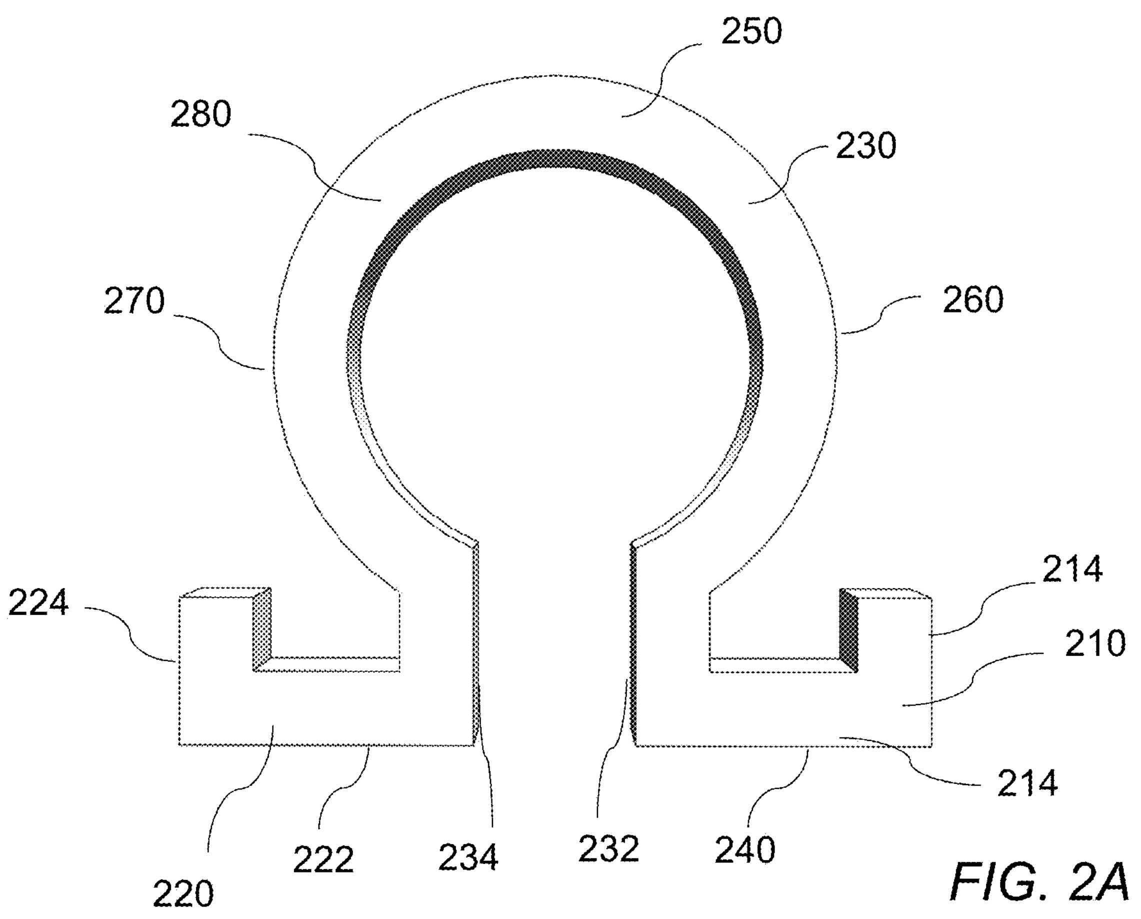
FIG. 2A is an isometric view of the front side of an exemplary embodiment of the conductive coil of FIGS. 1A-1B of the present invention.
Figure 2B:
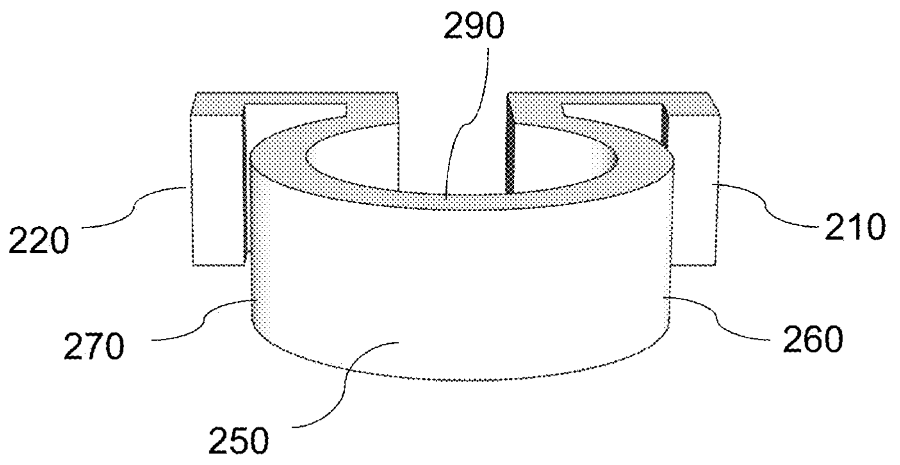
FIG. 2B is an isometric view of the top side of the conductive coil of FIG. 2A.
Figure 2C:
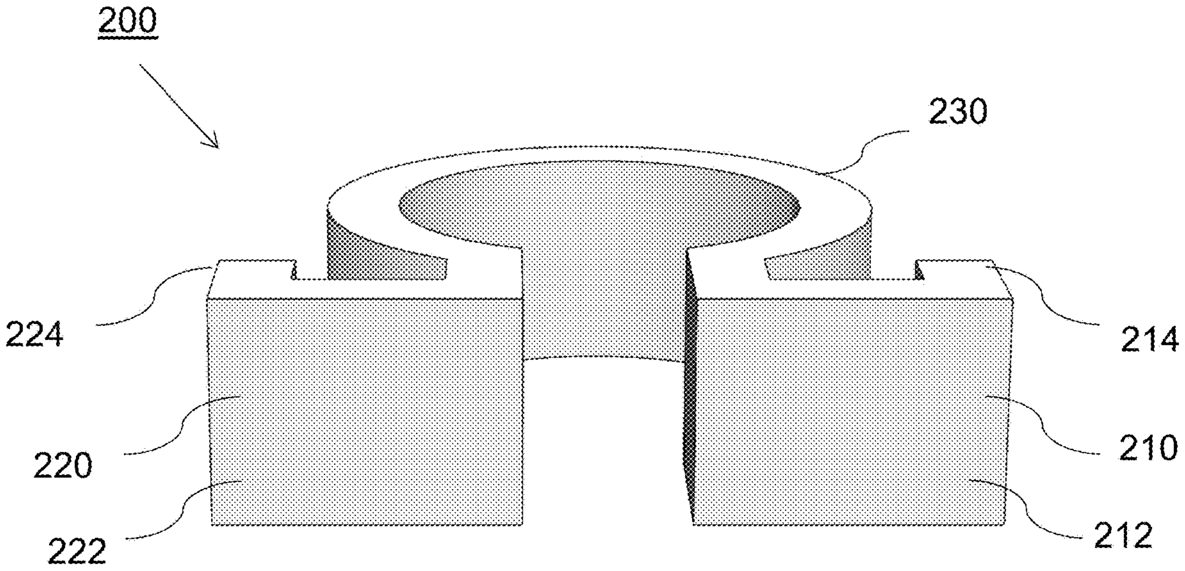
FIG. 2C is an isometric view of the bottom side of the conductive coil of FIG. 2A.
Figure 2D:
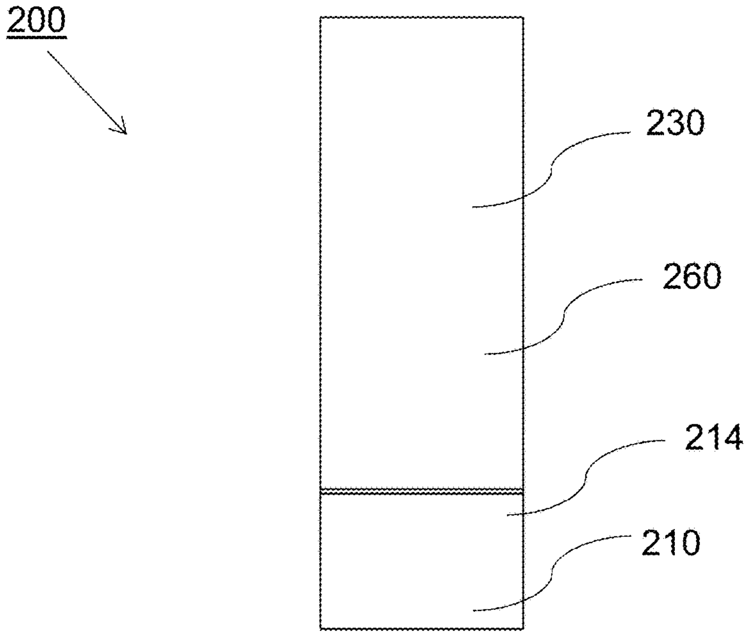
FIG. 2D is a plan view of a right side of the conductive coil of FIG. 2A. The left side of the conductive coil of FIG. 2A is preferably a mirror image of the right side depicted in FIG. 2D.

FIGS. 2A-2C show a conductive coil 200 according to an exemplary embodiment described herein. The conductive coil 200 is preferably a preformed member formed from a conductive material, such as a metal plate, sheet or strip. Acceptable metals used for forming the conductive coil 200 may be copper, aluminum, platinum, or other metals for use as inductor coils as are known in the art. In an exemplary embodiment the conductive coil may be made into a preformed member by bending the conductive material into a selected shape. Non-limiting examples of wires that can be used to form the conductive coil 200 include a flat wire, square wire, or rectangular shaped wire, round wire. One of skill in the art will recognize that other wire shapes could be used within the scope of this invention. The conductive coil 200 can have a uniform thickness, for example, such as that depicted in FIGS. 2A-2C, or can have varying thicknesses, for example, as shown in FIGS. 8A-8C and 9A-9B. In an embodiment, the conductive coil 200 can be a unitary, one-piece member. In another embodiment, the conductive coil 200 can consist of multiple pieces joined together, such as by welding, provided that the conductive coil 200 is fully formed prior to forming the inductor body about the conductive coil in a molding process.

The conductive coil 200 is preferably shaped in a configuration that provides for increased efficiency and performance in a small volume and that is simple to manufacture and results in minimal to no waste product. The shape of the conductive coil 200 is designed to optimize the path length to fit the space available within the inductor body 110 while minimizing resistance and maximizing inductance.

Figure 8A:
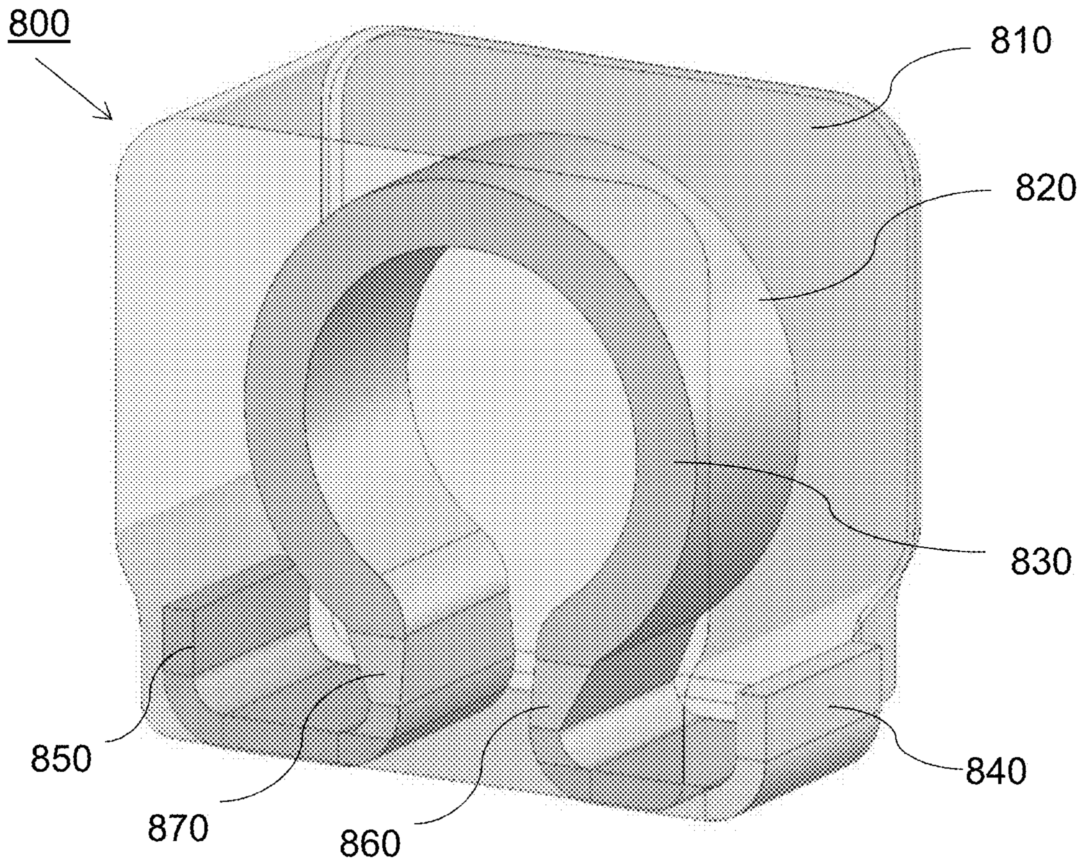
FIG. 8A is a partial transparent view of another exemplary embodiment of an inductor according to the present invention showing the conductive coil.
Figure 8B:
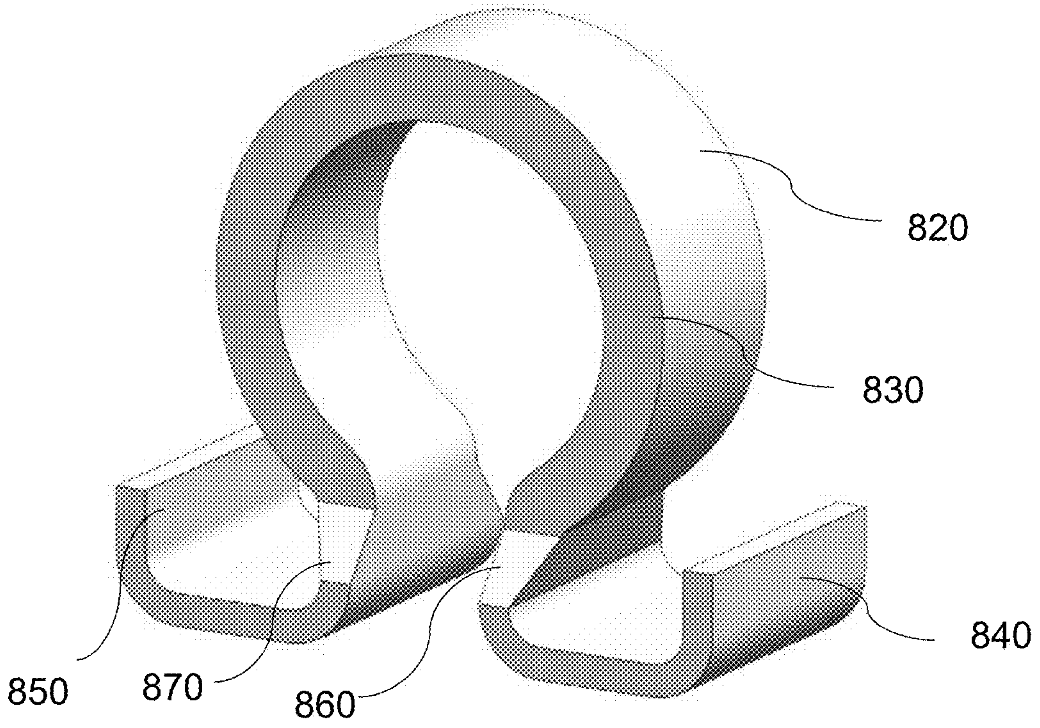
FIG. 8B is an isometric view of the is an isometric view of the conductive coil of FIG. 8A.
Figure 8C:
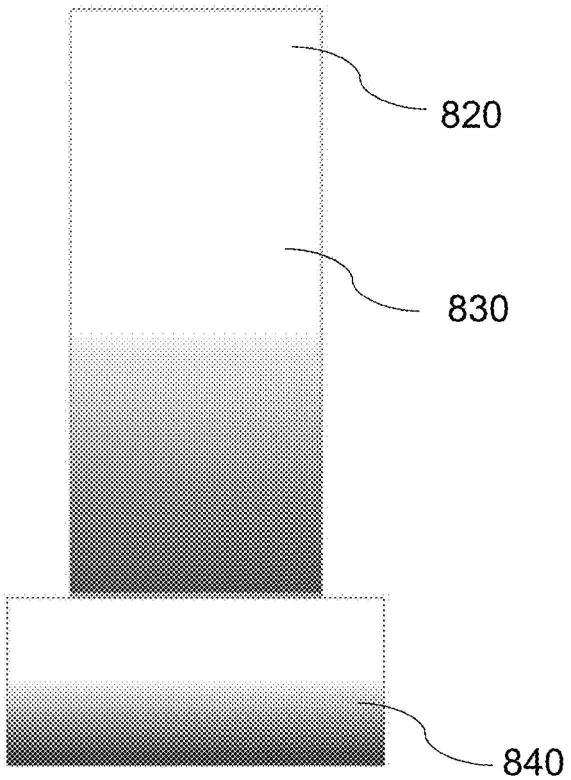
FIG. 8C is a plan view of a right side of the conductive coil of FIG. 8B. The left side of the conductive coil of FIG. 8B is preferably a mirror image of the right side depicted in FIG. 8C.
Figure 9A:
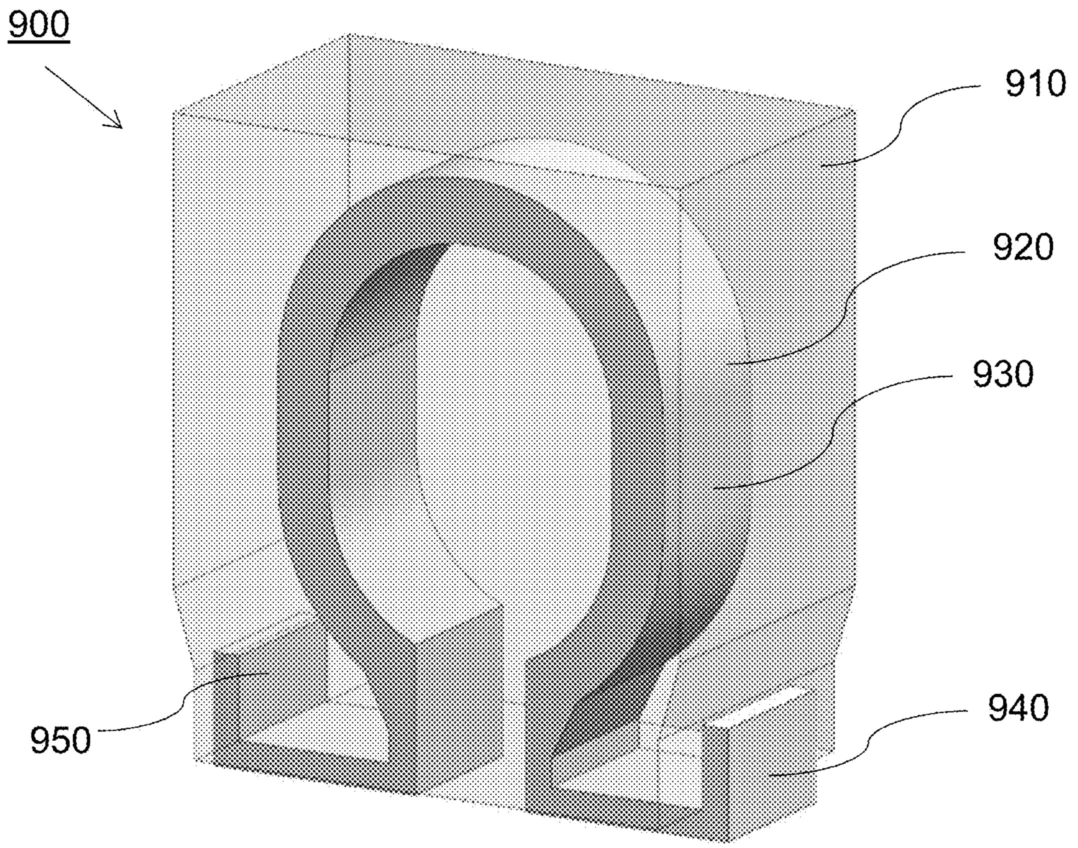
FIG. 9A is a partial transparent view of another exemplary embodiment of an inductor according to the present invention showing the conductive coil.
Figure 9B:
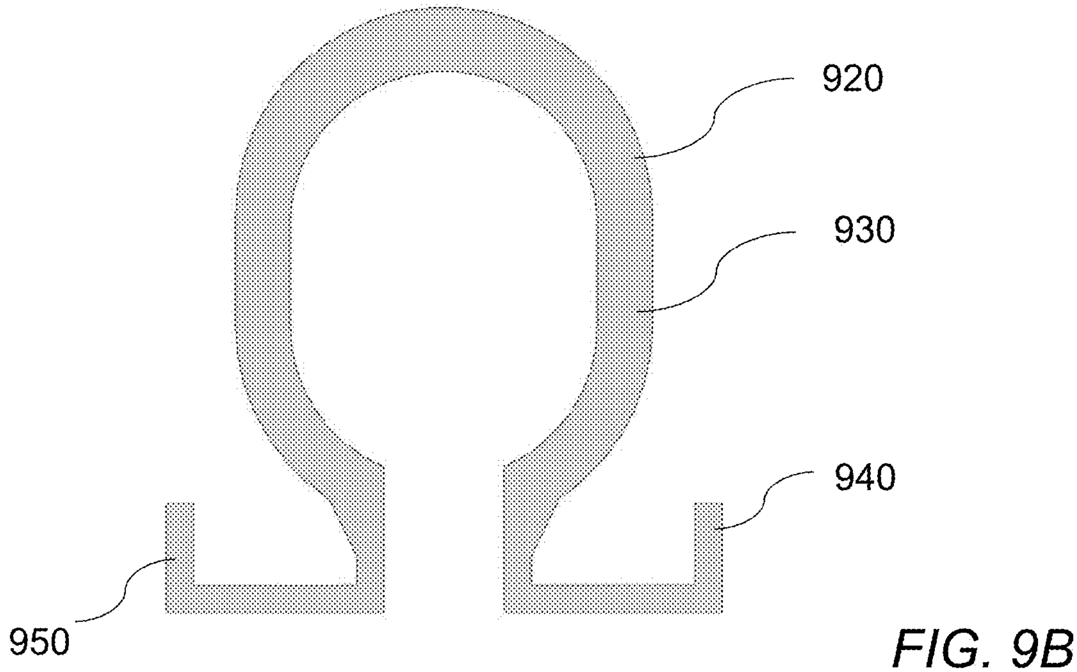
FIG. 9B is a plan view of the conductive coil of FIG. 9B.

As shown in the exemplary embodiment FIGS. 2A-2C, the conductive coil 200 preferably has right and left ends forming right and left leads 210, 220 and a medial portion 230. The right and left leads 210, 220 are preferably formed into an L-shape or a U-shape. One of skill in the art will recognize that when the right and left leads 210, 220 are formed into an L-shape or a U-shape, such L-shape or U-shape can consist of substantially right angle sections, for example, as shown in FIGS. 2A-2C, or substantially rounded sections, for example, as shown in FIGS. 8A-8C (discussed herein). The medial portion 230 is preferably formed in a circular or semi-circular shape; however, other shapes could be used based on the required inductor properties. In an embodiment, the medial portion 230 is preferably a single semi-circular shape, for example, as shown in FIGS. 2A-2C, or an oblong shape, for example, as shown in FIGS. 9A-9B, discussed herein. In addition, the medial portion 230 can include one or more wound circular segments or stacked coils. As shown in the preferred embodiment of FIGS. 2A-2C, the conductive coil 200 can be a flat wire that is omega-shaped having L-shaped right and left leads 210, 220 and a semi-circular medial portion 230. One of skill in the art will recognize that the right and left leads 210, 220 and medial portion 230 can be formed in other shapes suitable for performing the desired inductive properties within the scope of the present invention.

As shown in the exemplary embodiment of FIGS. 2A-2C, the conductive coil 200 has a bottom side 240 where the right and left leads 210, 220 are formed, a top side 250, a right side 260, a left side 270, a front side 280, and a back side 290. In an embodiment, the back side 290 is preferably a mirror image of the front side 280, and the left side 270 is preferably a mirror image of the right side 260. In an exemplary embodiment, the medial portion 230 has right and left extension legs 232, 234 adjacent the right and left leads 210, 220, respectively. Each of the right and left leads 210, 220 preferably comprises a bottom portion 212, 222 and side portion 214, 224. The bottom portion 212, 222 of each lead 210, 220 is preferably positioned between a respective one of the right and left extension legs 232, 234 and side portions 212, 222. The side portions 214, 224 preferably form the terminal end of each lead 210, 220. The side portions 214, 224 are preformed to be substantially perpendicular to the bottom portions 212, 222 of each lead 210, 220. While leads 210, 220 are illustrated with side portions 214, 224, one of skill in the art will recognize that the side portions 214, 224 can be omitted, and leads 210, 220 can terminate at the bottom portions 212, 222.

Referring back to FIGS. 1A-1H, each lead 210, 220 has a termination that is preferably exposed outside of the inductor body 110 and preformed such that at least a portion of the bottom portion 212, 222 of each lead 210, 220 is exposed along the lead side 120 of the inductor body 110 and the side portion 214, 224 of each lead 210, 220 is exposed along the respective right and left side 140, 150 of the inductor body 110. In an embodiment, the leads 210, 220 are L-shaped and are positioned along the lead side 120 and left and right sides 140, 150 of the inductor body 110. As used herein, "L-shape" or "L-shaped" includes two leg segments joined at an angle or by a curved member. For example, the bottom portion 212, 222 can extend to the side portion 214, 224 of each lead 210, 220 through a curved segment or a sharp angle.

Figure 1E:
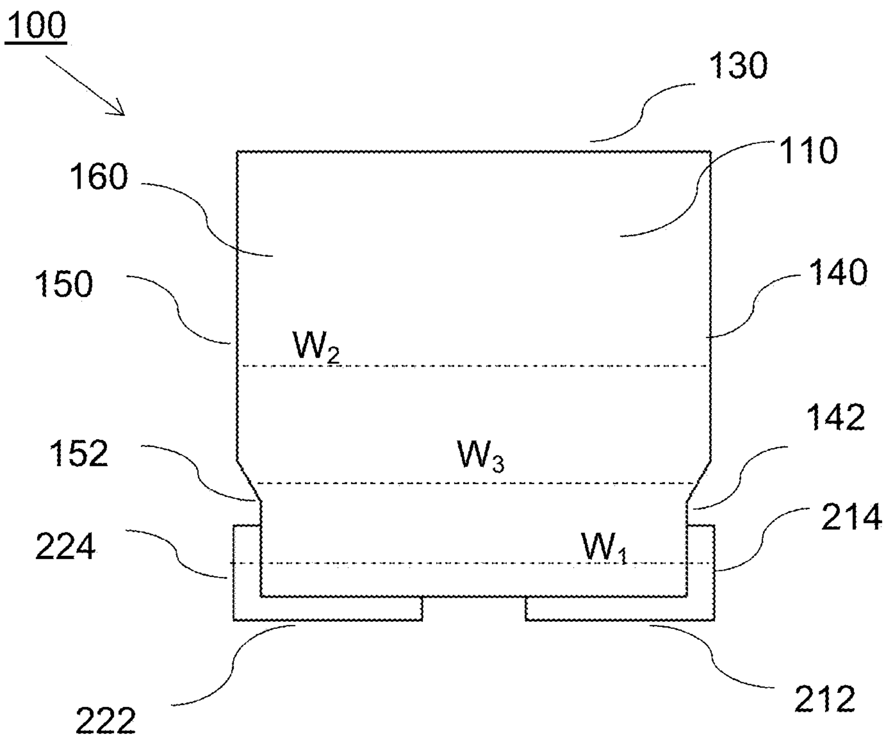
FIG. 1E is a plan view of the front side of the inductor of FIG. 1A.
Figure 1F:
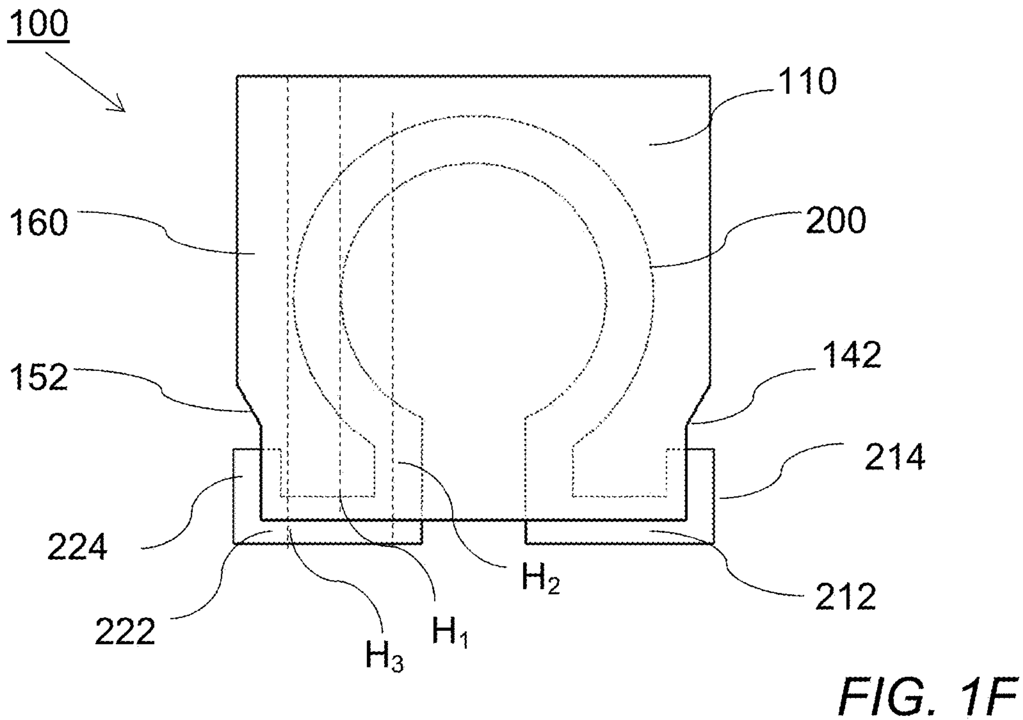
FIG. 1F is a partial transparent view of the inductor body of FIG. 1E showing the conductive coil.
Figure 1G:
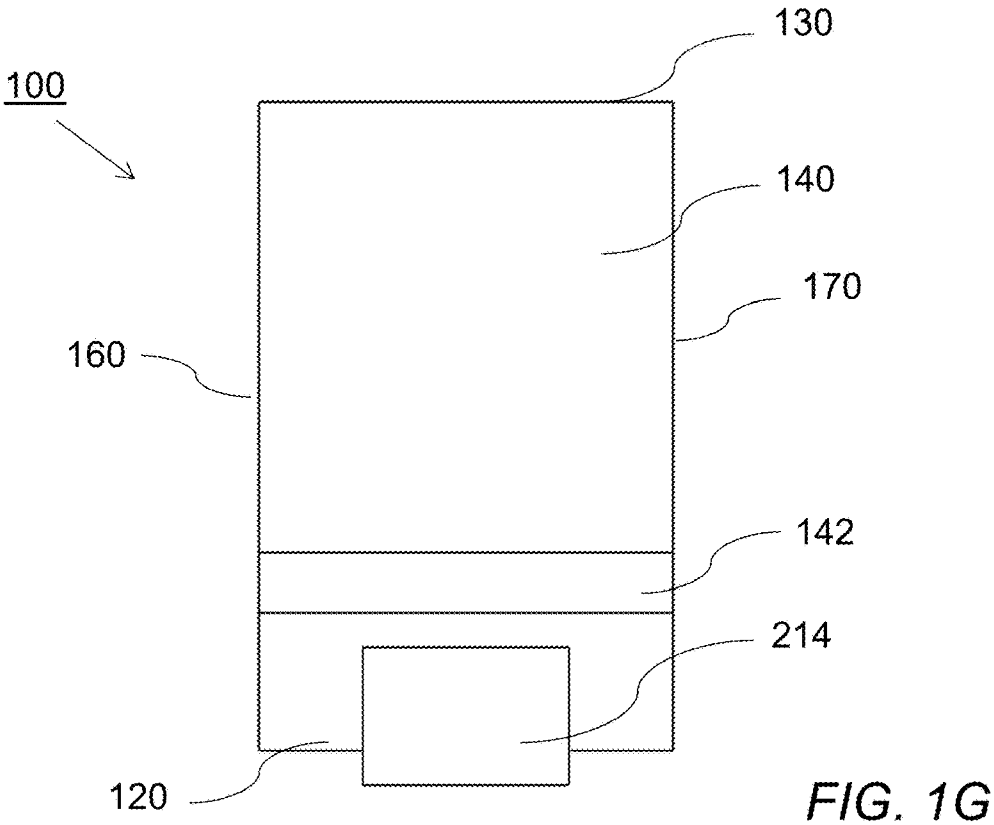
FIG. 1G is a plan view of the right side of the inductor of FIG. 1A. The left side of the inductor of FIG. 1A is preferably a mirror image of the right side depicted in FIG. 1G.

As best shown in FIGS. 1E and 1F, an indentation or cutout 142, 152 can be formed in each of the right and left sides 140, 150 of the inductor body 110. The inductor body 110 has a smaller width $W_3$ at the cutouts 142, 152 as compared to a maximum width $W_2$ of the inductor body 110. The exposed side portion 214, 224 of each lead 210, 220 is positioned along a respective cutout 142, 152 to minimize the impact of the leads 210, 220 in the width direction. In particular, by positioning the exposed side portion 214, 224 of each lead 210, 220 along a respective cutout 142, 152, the maximum width $W_1$ of the conductive coil 200 between the leads 210, 220 can be substantially the same width as the maximum width $W_2$ of the inductor body 110. Thus, the exposed side portion 214, 224 of each lead 210, 220 are substantially in line with a respective right and left side 140, 150 of the inductor body 110, which allows the overall size of the inductor 100 to be minimized. It is appreciated that the cutouts 142, 152 are not required in all circumstances, and the side portions 214, 224 of the leads 210, 220 could be formed along the right and lefts sides 140, 150 of the inductor body 110 without the cutouts 142, 152.

FIGS. 1B, 1D, 1F, and 1H show an exemplary embodiment of the inductor body 110 in partial transparency so as to view the conductive coil 200 within the interior of the inductor body 110. The finished inductor 100 according to the present invention preferably includes the inductor body 110 molded, formed about, pressed over, etc. the conductive coil 200. At least parts of the leads 210, 220 are exposed outside of the inductor body 110 at the lead side 120 and lower portions of the right and left sides 140, 150 of the inductor body 110. The leads 210, 220 form a significant portion of the bottom side or lead side 120 of the inductor 100.

The length, width, and height of the conductive coil 200 and inductor body 110 may vary based on the inductor application. The dimensions of the conductive coil 200 may be designed to increase the ratio of the space used compared to the space available in the inductor body 110.

As shown in FIG. 1F, in an embodiment, the conductive coil 200 may have a vertical height $H_1$ (from the bottom side 240 to the top side 250) that is substantially equal to or smaller than the vertical height $H_2$ of the inductor body 110 (from the lead side 120 to the top side 130). Because at least a portion of the leads 210, 220 of the conductive coil 200 are outside of the inductor body 110 in the formed inductor 100, at least the medial portion 230 of the conductive coil 200 can be completely embedded within the inductor body 110 when the conductive coil 200 and inductor body have substantially the same vertical height. Alternatively, the conductive coil 200 may have a vertical height $H_1$ that is >99%, >98%, >95%, >90%, >85%, >75%, >60%, or >50% of the vertical height $H_2$ of the inductor body 110.

Also as shown in FIG. 1E, the maximum width $W_1$ of the conductive coil 200 is substantially equal to the maximum width $W_2$ of the inductor body 110. One of ordinary skill in the art will recognize that the maximum width $W_1$ of the conductive coil 200 or the maximum width $W_2$ of the inductor body could be slightly different without departing from the spirit of the invention.

Figure 1H:
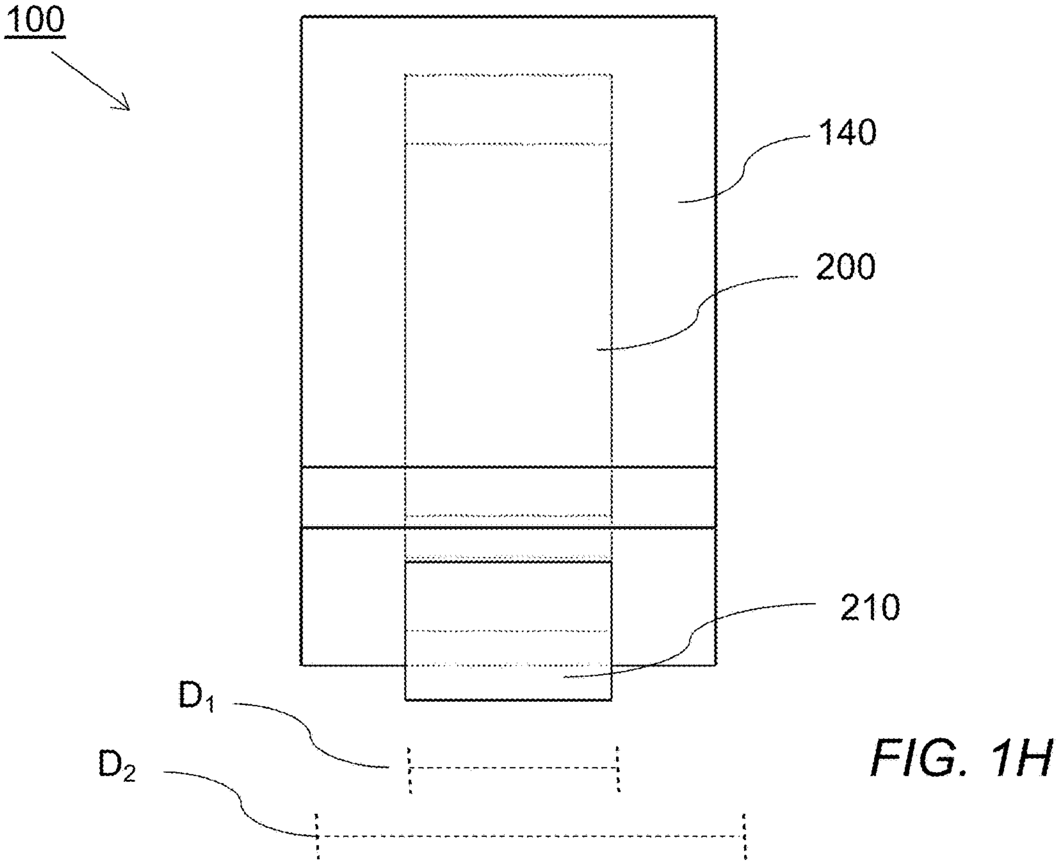
FIG. 1H is a partial transparency view of the inductor body of FIG. 1G showing the conductive coil.

As shown in FIG. 1H, the depth $D_1$ of the conductive coil 200 is preferably less than the depth $D_2$ of the inductor body 110. For example, the conductive coil 200 may be centered within the inductive body 110 along the depth direction and have a depth $D_1$ that is approximately 50% of the depth $D_2$ of the inductor body 110. One of ordinary skill in the art will recognize that the maximum width $W_1$ of the conductive coil 200 or the depth $D_1$ of the inductor body could be greater or less than 50% of the depth $D_2$ of the inductor body 110 without departing from the spirit of the invention.

In a non-limiting example, the maximum dimensions of the finished inductor can be approximately 10 mm (vertical height ($H_3$))×10 mm (width ($W_2$))×6 mm (depth ($D_2$). In such an embodiment, the vertical height $H_1$ of the conductive coil 200 is approximately 9 mm and the maximum vertical height $H_3$ of the inductor 100 is approximately 10 mm. The maximum width $W_1$ of the conductive coil 200 and maximum width $W_2$ of the inductor body 110 are both approximately 10 mm. The depth $D_1$ of the conductive coil 200 is approximately 3 mm and the depth $D_2$ of the inductor body 110 is approximately 6 mm. In a preferred embodiment, the inductor may achieve resistance below 0.15 mΩ and inductance above 100 nH while achieving a current rating which causes a 40° C. or less temperature rise above 100 A. In an embodiment, the current handling capability can be in the range of 100-125 A creating a 40° C. or less temperature rise.

One of skill in the art will recognize that there can be many variations in the length, width, and height of the conductive coil 200 and inductor body 110 within the scope of this disclosure. Other non-limiting examples of inductor dimensions according to the present disclosure include: 10 mm ($H_3$)×10 mm ($W_2$)×5 mm ($D_2$); 12 mm ($H_3$)×10 mm ($W_2$)×5 mm ($D_2$); 7 mm ($H_3$)×10 mm ($W_2$)×5 mm ($D_2$); and 5 mm ($H_3$)×8 mm ($W_2$)×4 mm ($D_2$).

In an embodiment, the resistance can range from 0.01 mΩ to 5.0 mΩ and the inductance can range from 10 nH to 1000 nH. One of skill in the art will recognize that the resistance typically increases as the inductance increases. However, the inductance can increase without an increase in resistance as the size of the inductor body 110 increases.

FIGS. 8A-8C illustrate an inductor 800 according to alternative embodiment described herein. Inductor 800 is generally formed of the same materials as inductor 100 shown in FIGS. 1A-1H. As shown in FIG. 8A, inductor 800 preferably includes an inductor body 810 partially surrounding a preformed conductive coil 820. Inductor 800 differs from inductor 100 shown in FIGS. 1A-1H and conductive coil 200 shown in FIGS. 2A-2C in that inductor 800 has a conductive coil 820 with a medial section 830 having different dimensions as compared with the right and left ends forming the right and left leads 840, 850. As shown in the preferred embodiment of FIGS. 8A and 8B, the conductive coil 820 is preferably a flat wire with an omega-shaped having L-shaped right and left leads 840, 850 and a semi-circular medial portion 830. The medial portion 830 of the conductive coil 820 preferably has a greater thickness than right and left leads 840, 850. The thickness of the wire gradually tapers from medial portion 830 along right and left extension legs 860 and 870. As a result, right and left leads 840, 850 preferably have a cross-sectional area that is flatter and wider than a cross-sectional area of the medial portion 830 as shown in FIG. 8C.

The inductor 800 depicted in FIGS. 8A-8C is advantageous in that the flatter, wider leads 840, 850 allow for greater stability particularly when making larger sized inductors. It also allows for an inductor to be made with a wider inductor body in the depth direction (direction (D) referenced in FIG. 1H), which results in additional core material and increased inductance.

In addition, increasing the width of the inductor's lead termination, such as inductor 800, allows for a thinner lead termination with the same cross sectional area. As a result, the electrical resistance of the lead termination can remain substantially the same while freeing additional space for core material in the same effective area. Because the size of the inductor is typically determined by the amount of space that it will take up on a circuit board, an inductor, such as inductor 800, in accordance with the present embodiment can more efficiently use the available circuit board space. In addition, an inductor having a wider lead termination, such as inductor 800, allows for a larger lead surface area to mount to a circuit board, which can provide a more secure attachment to a circuit board.

A wider lead termination, such as in inductor 800, also improves the inductor's shock and vibration handling capabilities, and improves heat transfer between the inductor and a circuit board. In addition, thinner, wider lead terminations, such as in inductor 800, are easier to form or bend.

In addition, one of skill in the art will recognize that an inductor having the reverse configuration, made with a flatter, wider medial portion and thicker narrower leads, is within the spirit and scope of the subject matter of the present application. An inductor made with a flatter, wider medial portion and a narrower lead can be used to match an existing circuit board footprint. For example, this advantageous in circuit boards having a fixed design or layout to fit a specific size inductor.

FIG. 9A-9B show an inductor 900 according to another alternative embodiment described herein. Inductor 900 is generally formed of the same materials as inductor 100 shown in FIGS. 1A-1H and inductor 800 shown in FIGS. 8A-8C. As shown in FIG. 9A, inductor 900 preferably includes an inductor body 910 partially surrounding a preformed conductive coil 920. Inductor 900 preferably has a conductive coil 920 preferably formed of a flat wire with an omega-shaped having a medial section 930 and L-shaped right and left leads 940, 950. Similar to inductor 800 shown in FIGS. 8A-8C, the medial portion 930 of the conductive coil 920 preferably has a greater thickness than right and left leads 940, 950, and the thickness of the wire gradually tapers from medial portion 930 towards the right and left leads 940, 950 such that the right and left leads 940, 950 are preferably flatter than medial portion 930 as shown in FIGS. 9A-9B. Inductor 900 differs from inductor 800 shown in FIGS. 8A-8C in that the medial portion 930 of the conductive coil 920 is oblong shaped as opposed to being semi-circular shaped, and the inductor body 910 has a greater height than its width. For example, and without limitation, the height to width ratio can be approximately 1.5:1 or 2:1. Alternatively, according to another embodiment (not shown), the medial portion of the conductive coil can be oblong shaped such that it has a smaller height relative to its width.

The inductor 900 depicted in FIGS. 9A-9B is advantageous in that the inductor body 910 can have various heights and widths to allow for a broader spectrum of applications. An inductor, such as inductor 900, is advantageous to customize the size of the inductor to more efficiently utilize the available space on a circuit board. For example, this is useful in applications where the circuit board's footprint is limited, but the height is more flexible. Similarly, this is also useful in applications in which the inductor's height is a limiting factor, but there is greater flexibility with the inductor's width or length.

Figure 3:
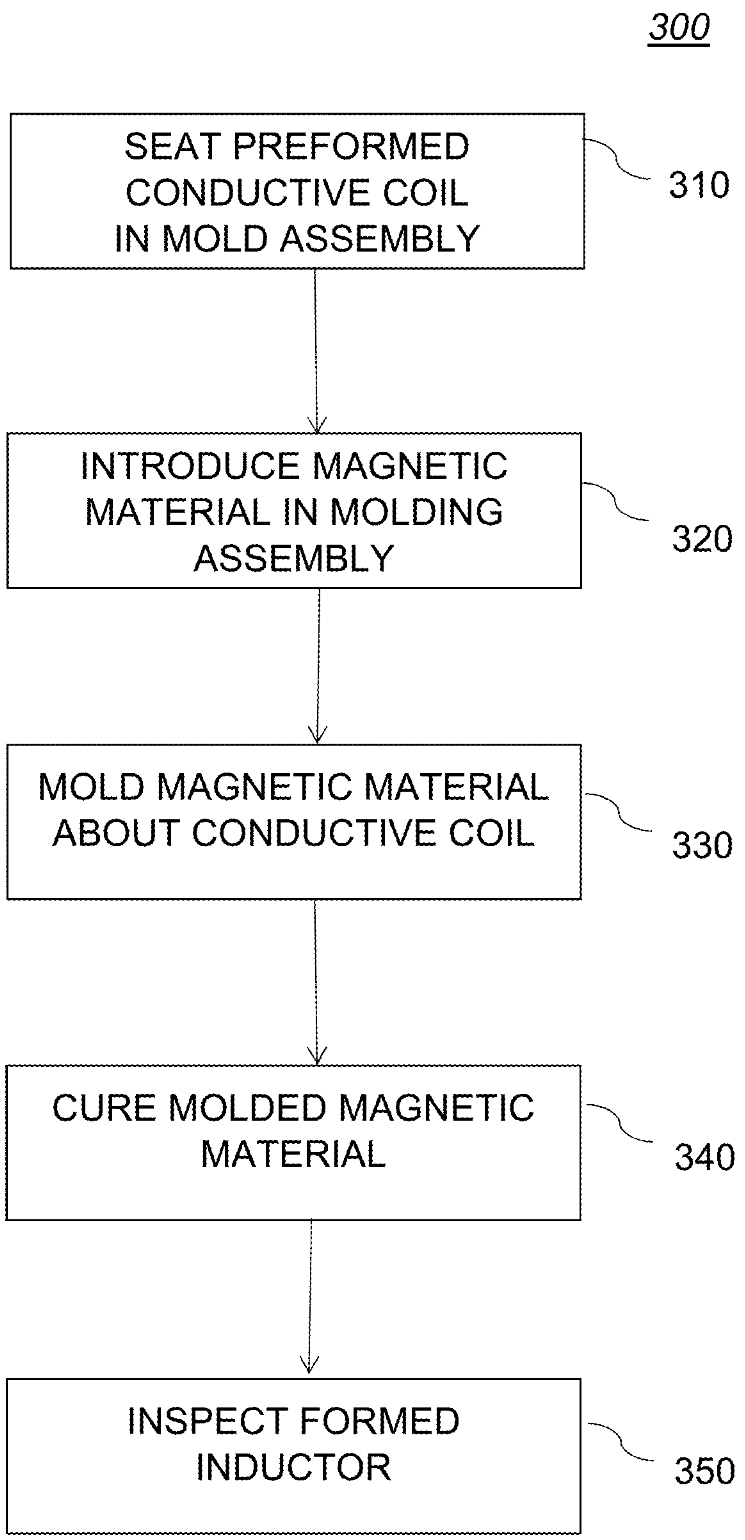
FIG. 3 is a flow diagram of an exemplary method for forming an inductor with a preformed termination according to the present invention.

FIG. 3 depicts an exemplary method 300 for making an inductor according to the present invention. In an embodiment, inductor body 110 may be formed from pressing a magnetic material around the preformed conductive coil 200. One of skill in the art will understand that the method of making an inductor described in FIG. 3 and the mold assembly described in FIGS. 4-7 reference inductor 100 for exemplary purposes only. One of skill in the art will understand that inductors using preformed conductive coils having different sizes and shapes and inductor bodies of different sizes and shapes are within the scope and spirit of the method and mold assembly described in FIGS. 3-7.

Figure 6A:
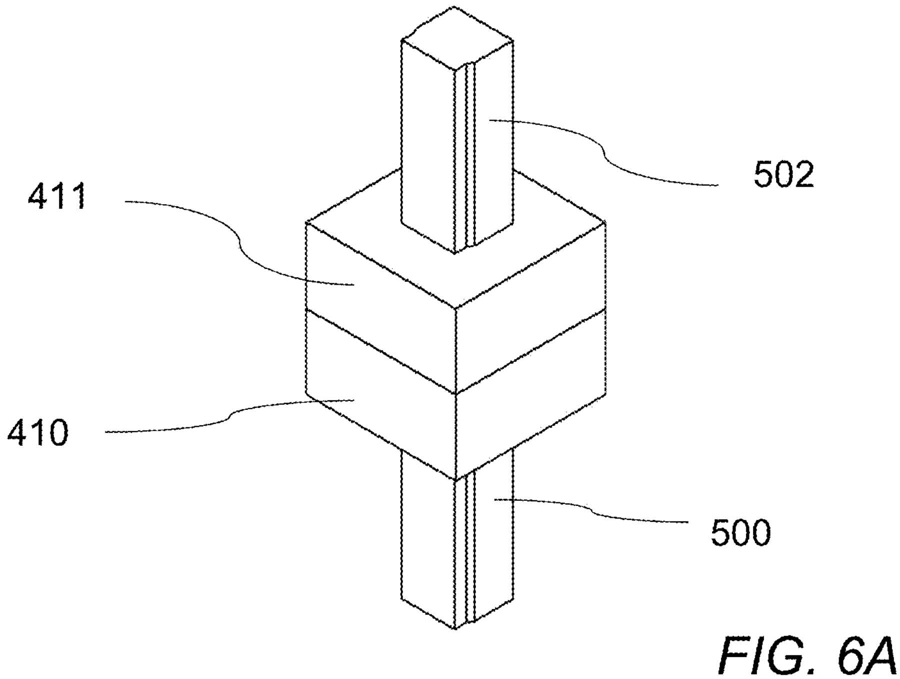
FIG. 6A is a perspective view of the mold assembly for forming an inductor with a preformed termination according to the present invention.
Figure 6B:
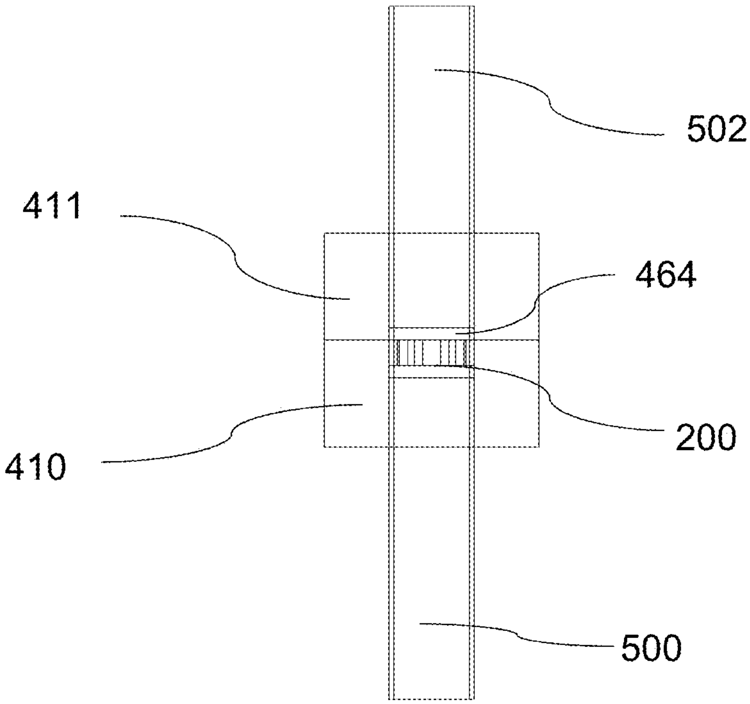
FIG. 6B is a cross sectional view of the mold assembly of FIG. 6A showing a conductive coil seated within the mold assembly.
Figure 6C:
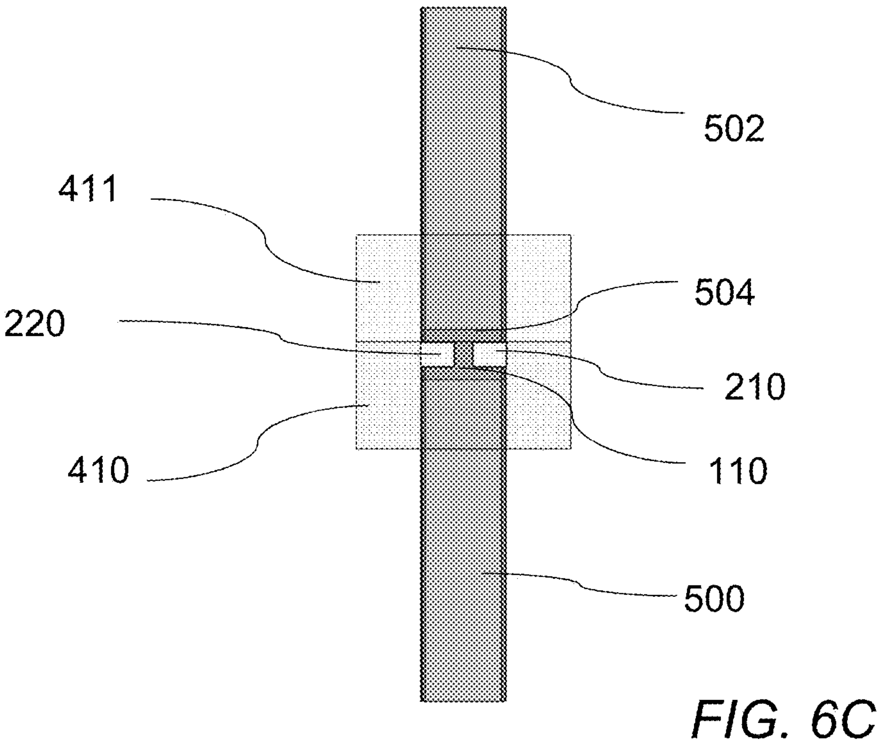
FIG. 6C is a cross sectional view of the mold assembly of FIG. 6A showing a formed inductor with a preformed termination according to the present invention within the mold assembly.

At step 310 the preformed conductive coil 200, such as that depicted in FIGS. 2A-2C, is preferably seated in a mold assembly 400. An exemplary mold assembly 400 is depicted in FIGS. 6A-6C with an upper mold section 410 and a lower mold section 411. One of skill in the art will recognize that terms "lower" and "upper" are used as points of reference in the drawings, and that lower mold section 410 can be at a top side of the mold assembly 400 and upper mold section 411 can be at a bottom side of the mold assembly 400. One of skill in the art will also understand that a single mold section or multiple mold sections can be used within the scope of the present invention.

Figure 4A:
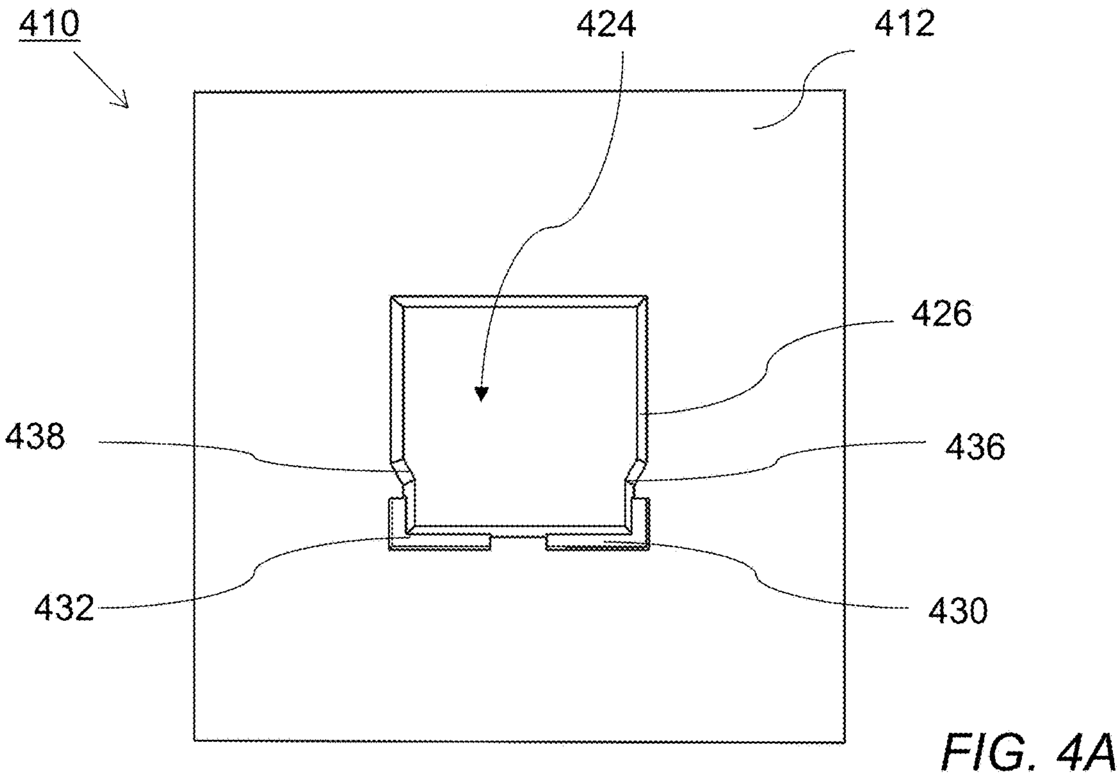
FIG. 4A is a plan view of an exemplary mold section for forming an inductor with a preformed termination according to the present invention.
Figure 4B:
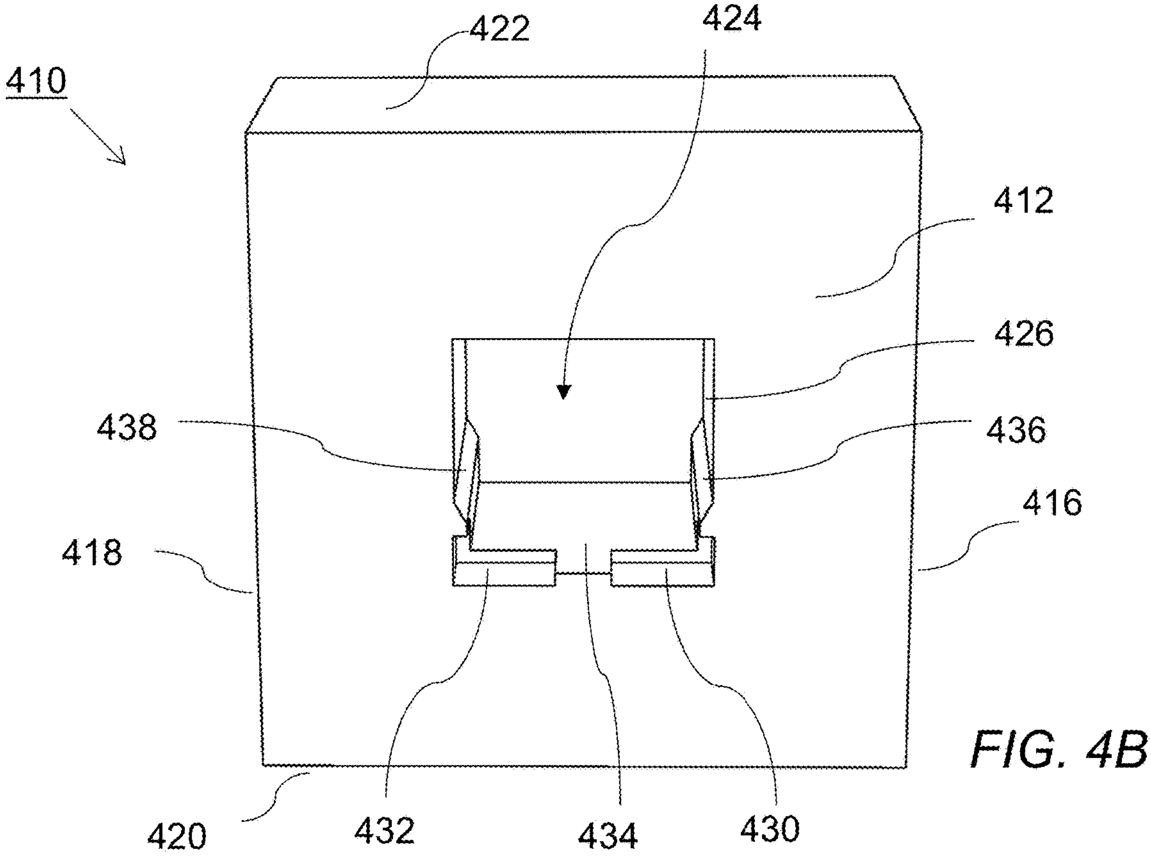
FIGS. 4B and 4C are perspective views of the mold section of FIG. 4A.
Figure 4C:
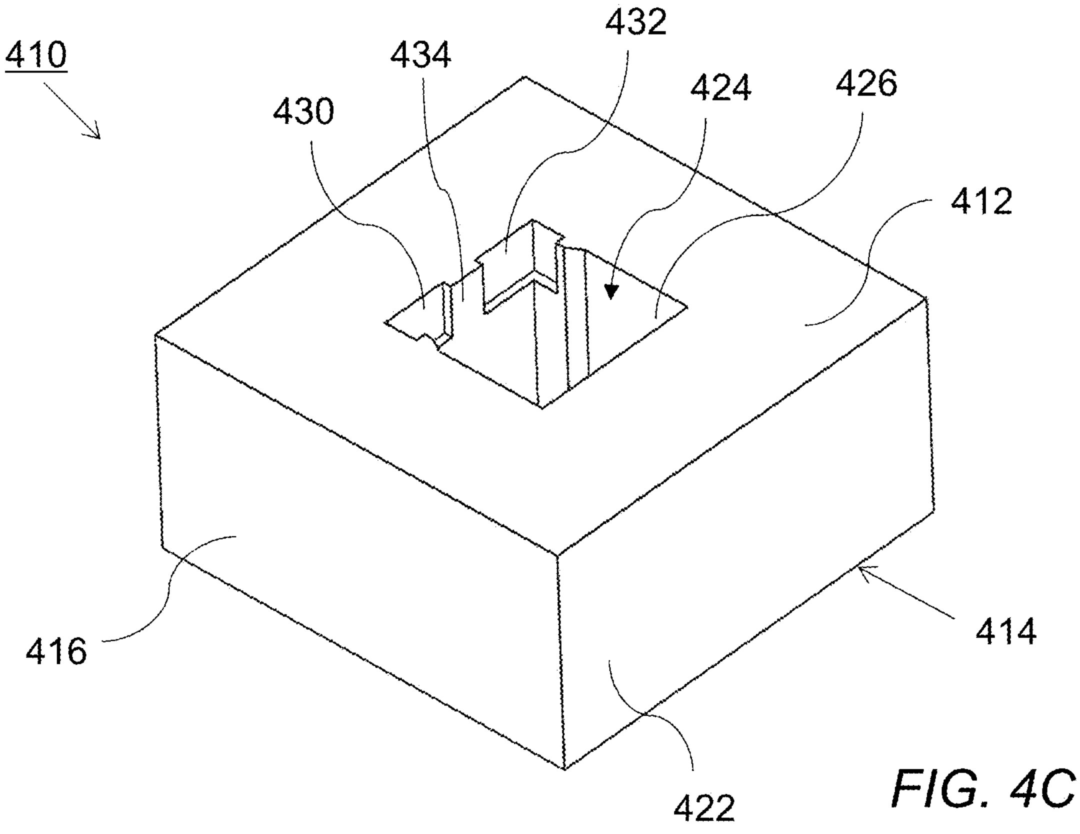

As shown in FIGS. 4A-4C, the lower mold section 410 is preferably block shaped having a top side 412, a bottom side 414, a right side 416, a left side 418, a front side 420, and a back side 422. One of skill in the art will recognize that the lower mold section 410 can have other shapes without departing the scope of the invention. The lower mold section 410 preferably has one or more seating channels 424. In the exemplary embodiment depicted in FIGS. 4A-4C, the lower mold section 410 has one seating channel 424; however, one of skill in the art will recognize that the lower mold section 410 can have multiple seating channels for production efficiency within the scope of the present invention. The seating channel 424 preferably extends from the top side 412 to the bottom side 414 through the lower mold section 410, and is preferably open on both the top side 412 and the bottom side 414. However, in an embodiment, the seating channel 424 can be closed one side. The lower mold section 410 can include an alignment hole (not shown) to align the lower mold section 410 with the upper mold section 411 during the molding process.

As shown in FIGS. 4A-4C, the seating channel 424 is defined by a channel wall 426. A right shelf 430 and left shelf 432 are preferably formed in the channel wall 426 and positioned to receive the right and left leads 210, 220 of the conductive coil 200. The right shelf 430 and left shelf 432 preferably have a shape that is complementary to the shape of leads 210, 220. In an embodiment, the right shelf 430 and left shelf 432 are L-shaped to accommodate the L-shaped leads 210, 220 of the conductive coil 200. An intermediate protrusion 434 is formed in the channel wall 426 and preferably positioned between the right and left shelves 430, 432. The intermediate protrusion 434 acts to form the section of the lead side 120 of the inductor body 110 positioned between the leads 210 and 220 in the formed inductor (see FIG. 1A). The seating channel 424 preferably has right and left narrowing walls 436, 438 formed in the channel wall 426 that form the right and left cutouts 142, 152 in the inductor body 110.

Figure 5A:
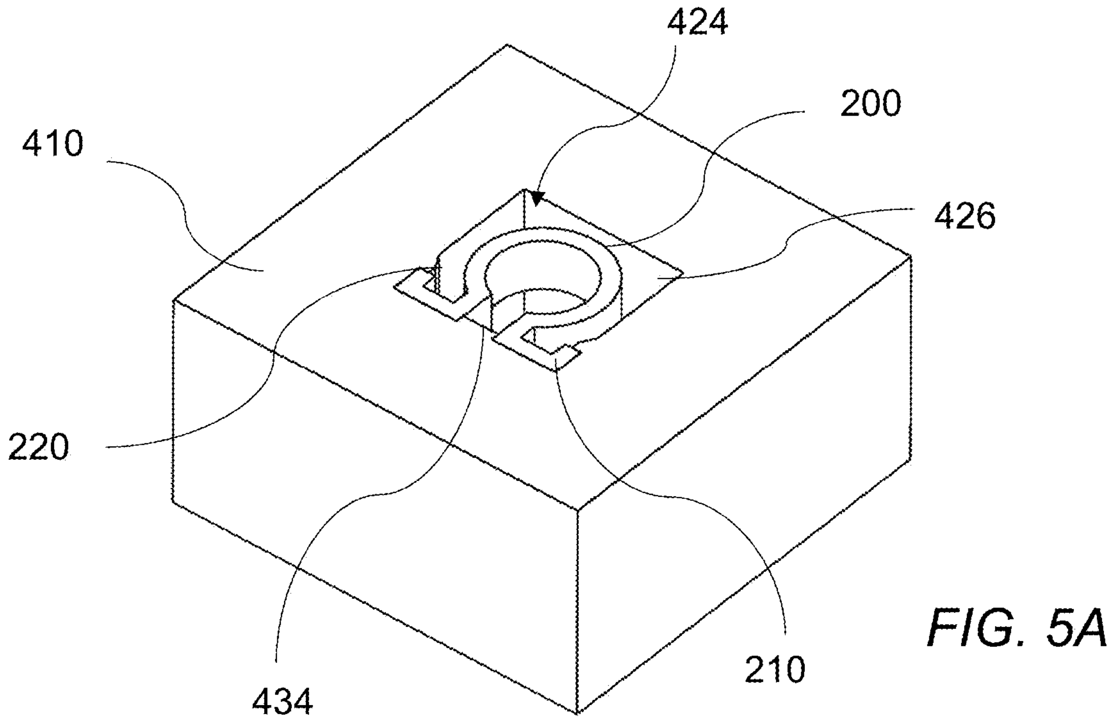
FIGS. 5A and 5B are perspective views of the mold section of FIG. 4A with a conductive coil seated in a seating channel.
Figure 5B:
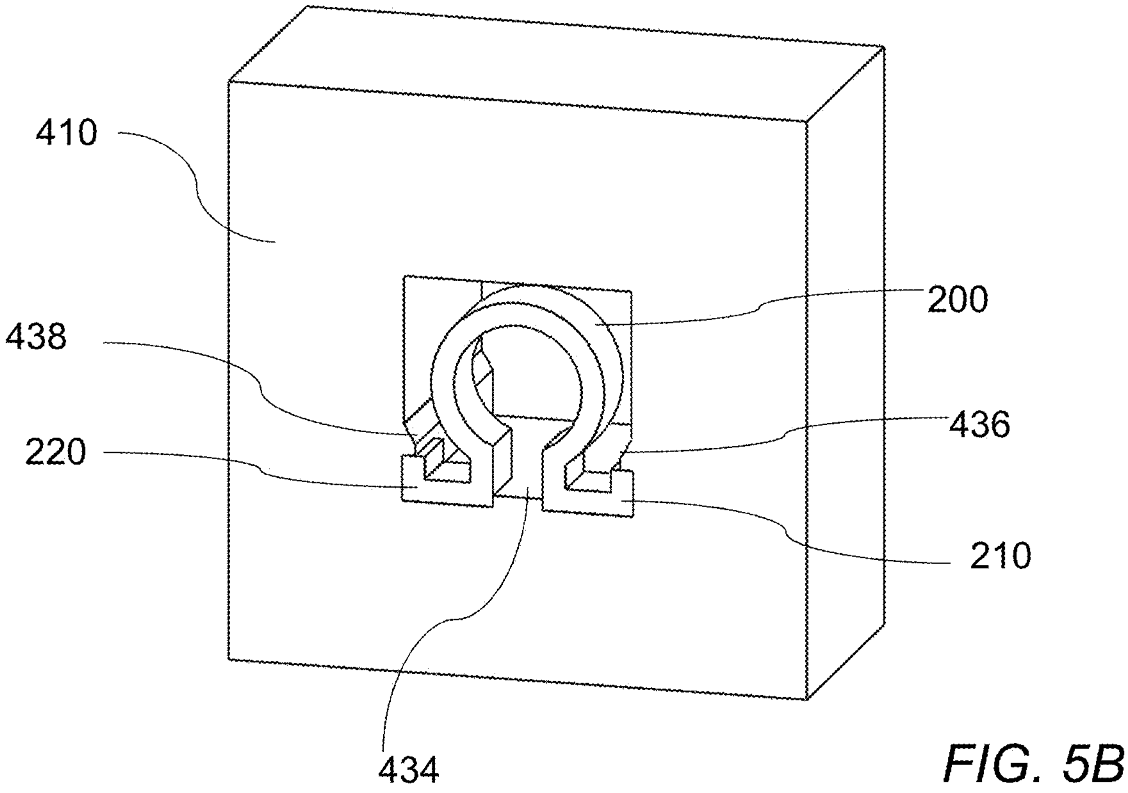

As shown in FIGS. 5A and 5B, the conductive coil 200 is preferably positioned in the seating channel 424 such that the right and left leads 210, 220 are seated within the right and left shelves 430, 432 of seating channel 424 and contact the channel wall 426. The right and left shelves 430, 432, right and left narrowing walls 436, 438, intermediate protrusion 434, and channel wall 426 preferably act together to limit movement of the conductive coil 200 during molding. In addition, the intermediate protrusion 434 and right and left leads 210, 220 preferably function to form the lead side 120 of the inductor body 110.

FIGS. 6A-6C illustrate an exemplary embodiment of the mold assembly 400 including lower mold section 410, upper mold section 411, a lower punch 500, and an upper punch 502. In an embodiment, the upper mold section 411 is preferably block shaped. One of skill in the art will recognize that the upper mold section 411 can have other shapes without departing the scope of the invention. The upper mold section 411 preferably has a receiving channel 464. One of skill in the art will recognize that the upper mold section 411 can have multiple receiving channels 464 to correspond with the number of seating channels 424 in the lower mold section 410. The receiving channel 464 preferably extends from a top side to a bottom side of the upper mold section 411, and is preferably open on both the top side and the bottom side. The upper mold section 411 can include an alignment hole (not shown) to align with the lower mold section 410 during the molding process.

Referring back to FIG. 3, at step 320, a magnetic material 504 can be introduced into the molding assembly 400. The magnetic material 504 is preferably magnetic particles, more preferably a powdered or granular magnetic material, and even more preferably a powdered iron material. The magnetic material 504 is preferably poured into the mold assembly 400 about the conductive coil 200. In an embodiment, a portion of the magnetic material 504 can be pre-compacted or pre-pressed and added to the mold assembly 400 along with the conductive coil 200. The pre-compacted or pre-pressed magnetic material can be subjected to an initial pressing step, and additional loose magnetic material 504 can then be added to the mold assembly 400 during a final pressing step.

At step 330, the magnetic material 504 is molded about the conductive coil 200 within the mold assembly 400. The magnetic material 504 is preferably pressed by lower and upper punches 500, 502 into a inductor body 110 that encompasses the conductive coil 200, with the exception of the exposed portions of the right and left leads 210, 220. In the exemplary embodiment shown in FIGS. 6A-6C, the lower punch 500 is inserted through the seating channel 424 from the bottom side 414 of the lower mold section 410, and upper punch 502 is inserted through the receiving channel 464 from the top side of the upper mold section 411 to press the powdered magnetic material about the conductive coil 200. FIG. 6B illustrates the mold assembly 400 without a magnetic material inserted about the conductive coil 200. FIG. 6C illustrates the mold assembly 400 with a magnetic material 504 inserted and pressed about the conductive coil 200. One of ordinary skill in the art will recognize that other forms of molding a powdered magnetic material can be employed without departing from the scope of the described method 300, including, without limitation, pressure molding, injection molding, etc.

Figure 7:
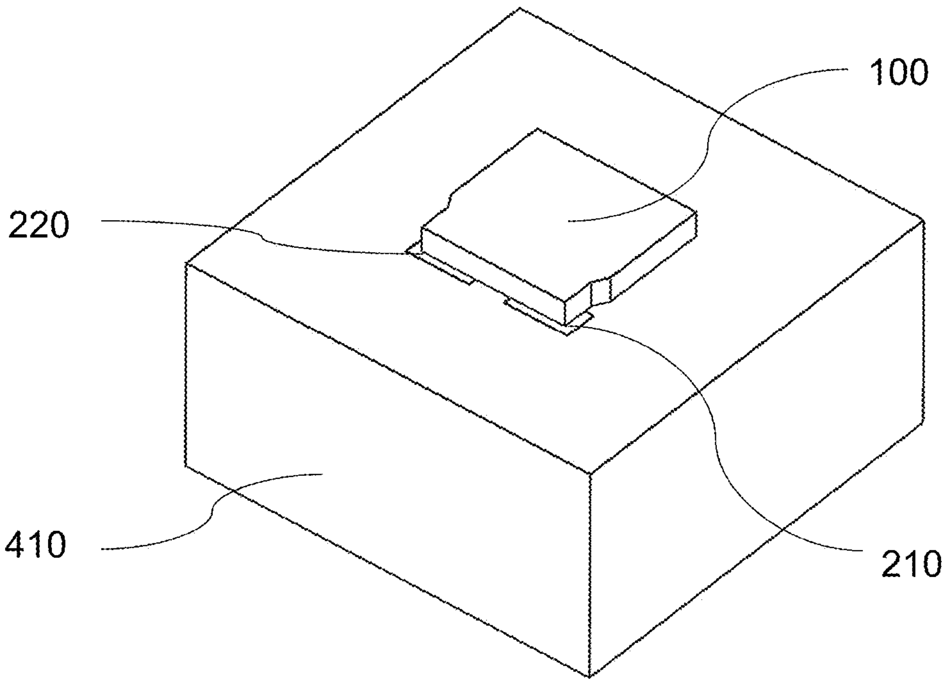
FIG. 7 is a perspective view of the mold section of FIG. 4A showing a formed inductor according to the present invention seated within the seating channel.

FIG. 7 illustrates a formed inductor 100 seated within lower mold section 411 after the molding step. After the molding the step, the magnetic material 504 is formed into a composite material about the conductive coil 200.

Referring back to FIG. 3, after the inductor 100 is formed by the molding process of step 330, the formed inductor 100 is cured, such as by heating in an oven, at step 340. This curing process binds the powdered magnetic materials forming the inductor body together. One of skill in the art will recognize that other forms of curing can be utilized without departing from the scope of the present invention.

At step 350, the formed inductor 100 is optionally inspected, such as by visual inspection and/or electrical characteristic inspection. The unique arrangement of the leads 210, 220 allows for a stronger solder joint connection between the inductor and a circuit board, and also allows for improved visibility during overhead inspection, such as AOI or x-ray inspection.

An inductor 100 made with the preformed conductive coil 200 according to any of the embodiments discussed herein eliminates the need for welding the leads to a lead frame, a resulting weld joint, and post-process cutting of the lead frame, which improves inductor performance. An inductor 100 made with the preformed conductive coil 200 according to any of the embodiments discussed herein also eliminates the need for post-press lead processing, such as forming and/or bending the leads about the inductor body.

As discussed above, the leads 210, 220 of the conductive coil 200 function as a significant part of the seating channel 424, 426 wall during molding. This allows for an inductor 100 having the smallest footprint available while maximizing the useable core area within the inductor body 110. In addition, the arrangement of the conductive coil 200 within the seating channel 466 of the mold assembly 200 of the present invention limits movement of the conductive coil 200 during molding, which allows for consistent positioning of the conductive coil 200 within the inductor body 110, and preferably, within the center of the inductor body 110.

As shown in FIGS. 1A, 1B, 1G, and 1H, the exposed portions of the right and left leads 210, 220 make up a significant portion of the lead side 120 of the inductor body 110 which maximizes solder joint strength, and makes the inductor ideal for surface mount applications. In addition, the side portions 214, 224 provide additional shock and vibration stability to the finished inductor 100.

An inductor according to any of the embodiments discussed herein may be utilized in electronics applications, with relatively small footprint, surface mount, and/or high profile requirements, such as server applications or other applications including DC/DC converters for servers, ultrabooks, notebooks, automotive BLDC motors, and solar inverters. In addition, an inductor according to any of the embodiments discussed herein can preferably achieve one or more of the following: low direct current resistance (DCR) below 0.15 mΩ; inductance above 100 nH; direct current handling capability in the range of 100-125 A while creating a 40° C. temperature rise or less, a low profile and high current; efficiency in circuits and/or in situations where similar products cannot meet electric current requirements.

The formed inductor 100 described herein, provides a simple and cost-effective way to produce consistent inductors with minimal waste materials. Nearly all of the material used to make the inductor 100 are utilized in the finished product. Significant part and labor costs are achieved by the inductor 100 described herein as compared to competitive products which have waste parts, such as lead frames and wires, and additional labor requirements, due to post-processing trimming and forming.

It will be appreciated that the foregoing is presented by way of illustration only and not by way of any limitation. It is contemplated that various alternatives and modifications may be made to the described embodiments without departing from the spirit and scope of the invention. Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An inductor comprising:

a preformed conductive coil comprising a medial portion comprising a single curve-shaped turn positioned between first and second extension legs extending from respective first and second symmetrical terminal leads, the medial portion and the first and second symmetrical terminal leads of the preformed conductive coil comprise a single, continuous structure; and a unitary inductor body comprising a molded magnetic material surrounding a portion of the preformed conductive coil, the unitary inductor body comprises a front surface and an opposite back surface, a top surface and an opposite bottom surface, and a first side surface and an opposite second side surface, a height of the unitary inductor body extends between the top surface and the bottom surface and a width of the unitary inductor body extends between the first side surface and the second side surface, a depth of the unitary inductor body extends between the front surface and the back surface, the height of the unitary inductor body being greater than the depth of the unitary inductor body, the bottom surface is configured to face a surface to which the inductor is mounted, wherein each of the first and second symmetrical terminal leads of the preformed conductive coil has an exposed portion that is exposed outside of the unitary inductor body along the bottom surface of the unitary inductor body and an exposed terminal end surface, and wherein the first and second extension leg extend in a height direction from the bottom surface of the unitary inductor body, the single curve-shaped turn extends from the first and second extension legs towards the top surface of the unitary inductor body, the single curve-shaped turn has a first portion that curves outwardly from the first extension leg toward the first side surface and a second portion that curves outwardly from the second extension leg toward the second side surface.

2. The inductor of claim 1, wherein the magnetic material is molded around the medial portion and portions of the first and second symmetrical terminal leads of the conductive coil.

3. The inductor of claim 1, wherein the medial portion comprises a semi-circular shape or an oblong shape.

4. The inductor of claim 1, wherein the conductive coil is an upper case omega-shape.

5. The inductor of claim 1, wherein the first symmetrical terminal lead is a mirror image of the second symmetrical terminal lead.

6. The inductor of claim 1, wherein the exposed portion of each of the first and second symmetrical terminal leads further comprises:

a bottom portion positioned along the bottom surface of the unitary inductor body; and a side portion that terminates along a respective one of the first side surface and the second side surface of the unitary inductor body.

7. The inductor of claim 6, wherein each of the first side surface and the second side surface of the unitary inductor body comprises a cutout portion where the side portion of the respective one of the first and second symmetrical terminal leads is positioned, and a maximum width of the conductive coil between the respective side portion of the first and second symmetrical terminal leads is substantially the same as a maximum width of the unitary inductor body.

8. The inductor of claim 6, wherein the side portion of each of the first and second symmetrical terminal leads is preformed to be substantially perpendicular to the bottom portion.

9. The inductor of claim 1, wherein each of the first and second symmetrical terminal leads is substantially L-shaped or U-shaped, wherein a first portion of the L or U is positioned beneath the bottom surface of the unitary inductor body and a second portion of the L or U is positioned along a respective one of the first side surface and the second side surface of the unitary inductor body.

10. The inductor of claim 1, wherein each of the first and second symmetrical terminal leads of the conductive coil have a cross-sectional area that is flatter and wider than the cross-sectional area of the medial portion of the conductive coil.

11. The inductor of claim 1, wherein the magnetic material is a powdered magnetic material.

12. The inductor of claim 1, wherein the magnetic material is powdered iron particles.

13. The inductor of claim 1, wherein the magnetic material surrounds the entirety of at least the medial portion of the conductive coil.

14. The inductor of claim 1, wherein the preformed conductive coil is formed as a planar member.

15. The inductor of claim 1, wherein the exposed portion of each of the first and second symmetrical terminal leads of the preformed conductive coil is positioned along the bottom surface of the unitary inductor body along a common plane.

16. The inductor of claim 1, wherein a center line is defined in the height direction between the first side surface and the second side surface, and the single curve-shaped turn extends in a continuous path in the height direction, the continuous path extends outwardly from each of the first and second extension legs towards the respective first side surface and second side surface, and then inwardly toward and crosses the center line adjacent the top surface of the unitary inductor body.

17. The inductor of claim 16, wherein the unitary inductor body further comprises a depth extending between the front surface and the back surface, the height of the unitary inductor body being greater than the depth.

18. The inductor of claim 1, wherein a length of the preformed conductive coil comprising each of the first and second symmetrical terminal leads is both embedded in the unitary inductor body and exposed along the bottom surface of the unitary inductor body.

19. The inductor of claim 1, wherein a center line is defined in a height direction between the first side surface and the second side surface, and the extension legs are positioned more proximal to the center line than the first portion and the second portion of the single curve-shaped turn of the medial portion.

20. The inductor of claim 1, wherein a width between the first portion and the second portion of the single curve-shaped turn of the medial portion is greater than a width between the first extension leg and the second extension leg.

21. The inductor of claim 1, wherein a combined width of the exposed portions of the first and second terminal leads extend along a majority of the bottom surface of the unitary inductor body in the width direction.

22. An inductor comprising:

a conductive coil comprising a medial portion and first and second symmetrical terminal leads, the medial portion comprising first and second lateral extension legs extending from the respective first and second symmetrical terminal leads and a curved portion positioned between and extending from the first and second lateral extension legs; and a unitary inductor body comprising a magnetic material surrounding a portion of the conductive coil, the unitary inductor body having a front surface and an opposite back surface, a top surface and an opposite bottom surface, and a first side surface and an opposite second side surface, a height of the unitary inductor body extends between the top surface and the bottom surface, a width of the unitary inductor body extends between the first side surface and the second side surface, and a center line is defined in a height direction between the first side surface and the second side surface, the bottom surface is configured to face a surface to which the inductor is mounted, wherein each of the first and second symmetrical terminal leads of the conductive coil has an exposed portion that is exposed outside of the unitary inductor body along the bottom surface of the unitary inductor body and an exposed terminal end surface, the curved portion of the medial portion extends in the height direction from the first and second lateral extension legs towards the top surface of the unitary inductor body, the curved portion curves outwardly in a lateral direction from each of the first and second lateral extension legs towards the respective first side surface and second side surface and then curves inwardly toward and crosses the center line adjacent the top surface of the unitary inductor body, and a combined width of the exposed portions of the first and second terminal leads extend along a majority of the bottom surface of the unitary inductor body in the width direction.

23. The inductor of claim 22, wherein the unitary inductor body further comprises a depth extending between the front surface and the bottom surface, the height of the unitary inductor body being greater than the depth.

24. An inductor comprising:

a conductive coil comprising a medial portion and first and second symmetrical terminal leads, the medial portion comprising a curved portion positioned between and extending from first and second lateral extension legs, the medial portion and the first and second symmetrical terminal leads of the conductive coil comprise a single, continuous structure; and unitary inductor body comprising a magnetic material molded around a portion of the conductive coil, the unitary inductor body having a front surface and an opposite back surface, a top surface and an opposite bottom surface, and a first side surface and an opposite second side surface, a height of the unitary inductor body is defined between the top surface and the bottom surface and a center line is defined in a height direction between the first side surface and the second side surface, the bottom surface is configured to face a surface to which the inductor is mounted, wherein, the first and second lateral extension legs extend from the first and second symmetrical terminal leads adjacent the bottom surface of the unitary inductor body, and the curved portion of the medial portion extends outwardly from the first and second lateral extension legs towards the respective first side surface and the second side surface of the unitary inductor body and then inwardly towards a center of the top surface of the unitary inductor body, the unitary inductor body further comprises a depth extending between the front surface and the bottom surface, the height of the unitary inductor body being greater than the depth, and an exposed portion of each of the first and second symmetrical terminal leads of the conductive coil is exposed outside of the unitary inductor body along the bottom surface of the unitary inductor body and has an exposed terminal end surface.

* * * * *